United States Patent [19]
Takaishi et al.

[11] Patent Number: 5,731,973
[45] Date of Patent: Mar. 24, 1998

[54] DEVELOPING SYSTEM AND MEASURING SYSTEM FOR FILING APPARATUS

[75] Inventors: Kazuhiko Takaishi; Susumu Hasegawa; Eiji Okamura, all of Kawasaki, Japan

[73] Assignee: Fujitsu Limited, Kawasaki, Japan

[21] Appl. No.: 516,970

[22] Filed: Aug. 18, 1995

[30] Foreign Application Priority Data

Jan. 6, 1995 [JP] Japan ................................. 7-000528

[51] Int. Cl.⁶ .................................................. G06F 19/00
[52] U.S. Cl. ................... 364/167.01; 360/78.09; 369/44.34
[58] Field of Search ................ 364/167.01, 149–151, 364/148, 176, 188, 189; 360/78.09, 75, 78.14, 77.02; 369/32, 44.25, 44.32, 44.34; 395/404; 318/561

[56] References Cited

U.S. PATENT DOCUMENTS

| | | | |
|---|---|---|---|
| 4,620,243 | 10/1986 | Bakken et al. | 360/77 |
| 4,816,941 | 3/1989 | Edel et al. | 360/78.12 |
| 4,835,633 | 5/1989 | Edel et al. | 360/78.12 |
| 5,267,102 | 11/1993 | Yamagata | 360/75 |
| 5,307,330 | 4/1994 | Okamura | 369/32 |
| 5,384,671 | 1/1995 | Fisher | 360/51 |
| 5,416,646 | 5/1995 | Shirai | 360/46 |
| 5,469,414 | 11/1995 | Okamura | 369/32 |

FOREIGN PATENT DOCUMENTS

| | | |
|---|---|---|
| 55-64661 | 5/1980 | Japan . |
| 55-64662 | 5/1980 | Japan . |
| 1-73574 | 3/1989 | Japan . |
| 1-138470 | 5/1989 | Japan . |
| 3-105773 | 5/1991 | Japan . |
| 4-221471 | 8/1992 | Japan . |
| 4-268282 | 9/1992 | Japan . |

*Primary Examiner*—Joseph Ruggiero
*Attorney, Agent, or Firm*—Greer, Burns & Crain, Ltd.

[57] ABSTRACT

An existent filing apparatus transfers position information to a developing device. A microcontroller unit of the developing device calculates the current value for moving a head by using the position information in accordance with a firmware, and supplies the current value to the filing apparatus. The filing apparatus drives a motor on the basis of the current value, detects the current head position and supplies the detected head position to the developing device. The microcontroller unit of the developing device determines the next current value by using the head position information in accordance with the firmware, and a monitoring means of the developing device monitors the operation of the filing apparatus on the basis of the head position information and displays the monitored operation.

25 Claims, 31 Drawing Sheets

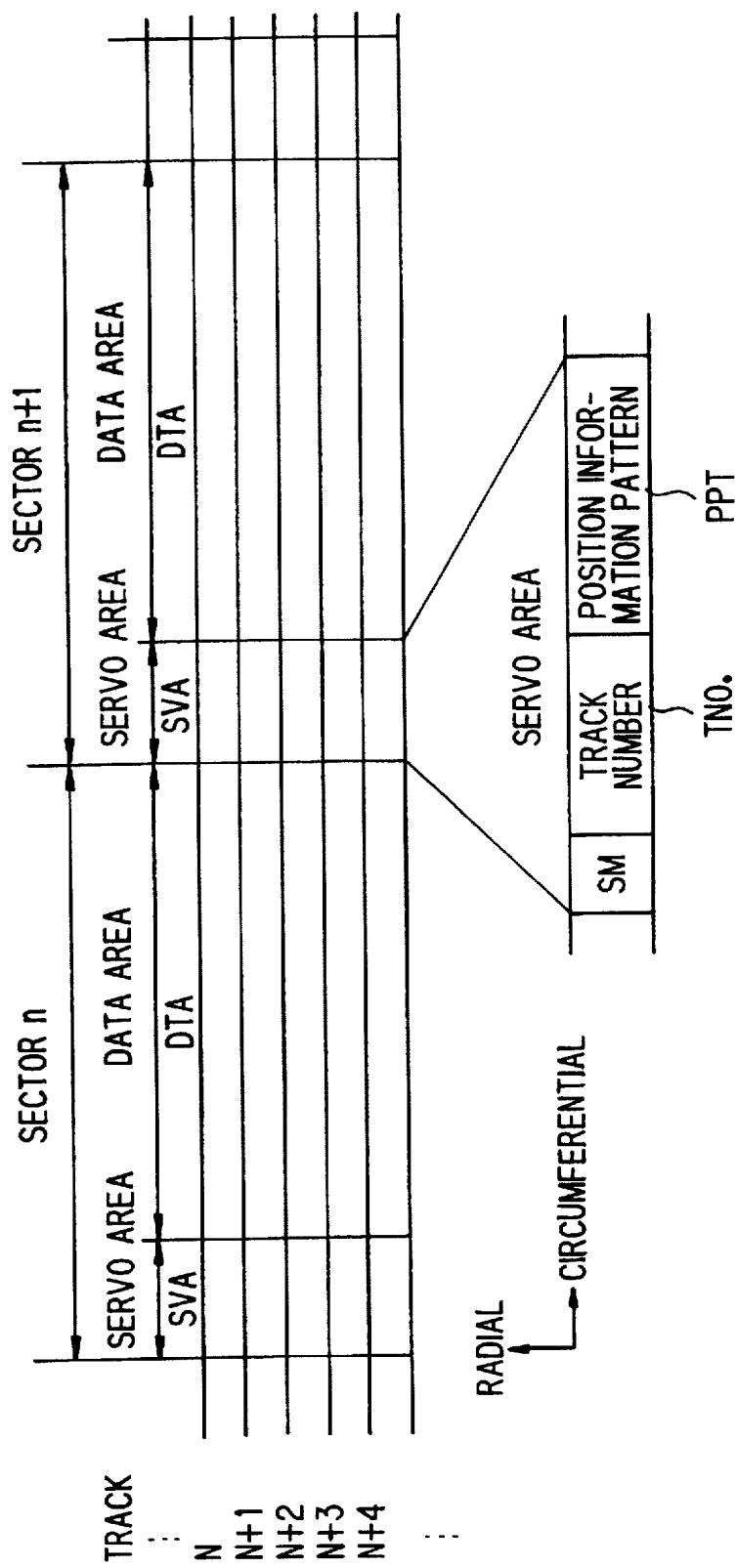

FIG. 11

| TYPE OF FILING APPARATUS | VARIOUS SERVO CONSTANTS | SAMPLING PERIOD | TRACK WIDTH | ACCELERATION CONSTANT | MAXIMUM CURRENT VALUE | ... |
|---|---|---|---|---|---|---|
| 001 | 2.5 INCH TYPE A | | | | | |
| 002 | 2.5 INCH TYPE B | | | | | |
| 003 | 3.5 INCH TYPE A | | | | | |
| ... | | ... | | ... | ... | ... |

FIG. 15

| | 1 FILING APPARATUS | 2 DEVELOPING DEVICE | |
|---|---|---|---|
| TIME SERIES ↓ | INTERRUPTION OCCURS | INTERRUPTION OCCURS | 101b |
| 101a | READ PosA, B, C, D<br>CONFIRM THAT PosAck IS "0"<br>WRITE PosA, B, C, D INTO FIRST RAM | WAIT UNTIL PosReq BECOMES "1" | |
| 102a | SET PosReq | | 102b |
| 103a | WAIT UNTIL PosAck BECOMES "1"<br>(SPM CONTROL PROCESSING) | READ PosA, B, C, D FROM FIRST RAM OF CONNECTING DEVICE<br>SET PosAck | 103b |
| 104a | CLEAR PosReq | WAIT UNTIL PosReq BECOMES "0" | 104b |
| 105a | WAIT UNTIL CurReq BECOMES "1" | CLEAR PosAck<br>CALCULATION PROCESSING IN SERVO SYSTEM<br>CONFIRM THAT CurAck IS "0"<br>WRITE CURRENT VALUE TO SECOND RAM OF CONNECTING DEVICE<br>SET CurReq | 105b |
| 106a | READ CURRENT VALUE FROM SECOND RAM<br>SUPPLY DESIGNATED CURRENT VALUE TO VCM<br>SET CurAck | WAIT UNTIL CurAck BECOMES "1" | 106b |
| 107a | WAIT UNTIL CurReq BECOMES "0" | CLEAR CurReq | 107b |
| 108a | CLEAR CurAck | | |
| | ------LOOP------ | IN THE CASE OF MULTIRATE CONTROL | |
| 111a | WAIT UNTIL CurReq BECOMES "1" | CALCULATION PROCESSING IN SERVO SYSTEM<br>CONFIRM THAT CurAck IS "0"<br>WRITE CURRENT VALUE TO SECOND RAM OF CONNECTING DEVICE<br>SET CurReq | 111b |
| 112a | READ CURRENT VALUE FROM SECOND RAM<br>SUPPLY DESIGNATED CURRENT VALUE TO VCM<br>SET CurAck | WAIT UNTIL CurAck BECOMES "1" | 112b |
| 113a | WAIT UNTIL CurReq BECOMES "0" | CLEAR CurReq | 113b |
| 114a | CLEAR CurAck | | |
| | (SPM CONTROL PROCESSING, ETC.)<br>WAIT FOR NEXT SERVO INTERRUPTION | (COMMAND PROCESSING)<br>WAIT FOR NEXT SERVO INTERRUPTION | |

FIG.25

| |
|---|
| POSITION OF VCM |
| SPEED OF VCM |
| TARGET SPEED OF VCM |
| CURRENT VALUE OF VCM |
| RAM ADDRESS INDICATING THE CURRENT OPERATION OF VCM PROCESSING |
| NUMBER OF REVOLUTIONS OF SPM |

FIG.26

| | |
|---|---|
| 00 | FREE RUN |
| 01 | POWER ON |
| 02 | START OF SPM ROTATION |
| 03 | ON TRACK |
| 04 | START OF SEEKING |
| 05 | END OF SEEKING |
| 06 | DETECTION OF SHOCK |
| 07 | START OF CALIBRATION |

FIG.27

| NUMBER | ADDRESS | SIZE | MEASURED DATA |
|---|---|---|---|
| 00 | XXXXH | 2 | POSITION OF VCM |
| 01 | XXXXH | 2 | SPEED OF VCM |
| 02 | XXXXH | 2 | TARGET SPEED OF VCM |
| 03 | XXXXH | 2 | CURRENT VALUE OF VCM |
| 04 | XXXXH | 2 | RAM ADDRESS INDICATING THE CURRENT OPERATION OF VCM PROCESSING |
| 05 | XXXXH | 2 | NUMBER OF REVOLUTIONS OF SPM |
| 06 | XXXXH | X | GIVEN ADDRESS |
| | | | - - - - |

FIG.28

| |
|---|
| INTERVAL OF MEASUREMENT (SAMPLING) |
| MEASURING TIME |
| MEASURING TIME BEFORE DETECTION OF TRIGGER |
| MEASURING MODE |
| TRIGGER FOR STARTING MEASUREMENT |
| TYPE OF DATA MEASURED |
| - - - |

DEVELOPING SYSTEM AND MEASURING SYSTEM FOR FILING APPARATUS

BACKGROUND OF THE INVENTION

1. Field of the Invention

The present invention relates to a developing system and a measuring system for filing apparatus and, more particularly, to a developing system for developing a firmware of a microcontroller unit which constitutes a filing apparatus and a measuring system for measuring the mechanical operation of a filing apparatus.

2. Description of the Related Art (a) Development of a filing apparatus

A filing apparatus including a magnetic disk apparatus and an optical disk apparatus is required to control an actuator and a motor at a higher speed and with a higher accuracy with the recent increase in the capacity of the filing apparatus. With the progress of semiconductor technique microcontroller units (hereinafter referred to as "MCU") which are operated at higher speeds and with a lower consumptive electric power have been developed. In this state, it is necessary to utilize an MCU other than a conventionally used one in order to develop an apparatus which is operated with higher accuracy and lower consumptive electric power. In developing firmware for a filing apparatus, since much importance is placed on processing speed, a machine language is often utilized as the language for describing the source code. However, during research and development of a control system and an experiment system for education, it is better to utilize a high level program language such as the C language than to use a machine language which is dependent upon a specific MCU.

In the development of firmware of a control system for a conventional filing apparatus, when a new MCU is utilized, all of the circuits necessary for the operation of the control system are created. Therefore, it is necessary to finish all of the operations including the preparation of electronic parts such as ICs, the creation of circuits, the creation of the DE (disk enclosure) of the filing apparatus, and the operation of writing a positioning signal on a medium surface before starting the firmware developing operation.

As a result, the development of a filing apparatus is often delayed, which leads to a delay in the development of a product. In the case of utilizing a filing apparatus for research and education, it is necessary to master the structure of the circuits and the machine language of the MCU, which is a problem during research and development.

(b) Measurement of a mechanical operation of a filing apparatus

In a recent magnetic filing apparatus and an optical filing apparatus, the area of the printed circuit board which is exposed to the box body of the apparatus is apt to be reduced due to a reduction in the size of the apparatus. In a filing apparatus having a compatible size with that of an IC memory card, the printed circuit board is completely covered so as to prevent the user from directly touching it. In other words, the printed circuit board is not exposed to the outside. In addition, many filing apparatuses are accommodated in computers when they are used, so that it is difficult to directly touch them.

In a conventional filing apparatus, the mechanical operation of the apparatus, especially, the operation of a voice coil motor (VCM) and of a spindle motor (SPM), are measured by a measuring machine which is connected to a terminal exclusively for measurement provided on the printed circuit board. According to this method, it is necessary that the printed circuit board be exposed to the outside. If the printed circuit board is not exposed to the outside, a cable is soldered to the printed circuit board, or a part of the box body of the filing apparatus is transformed so as to expose the printed circuit board to the outside, for the purpose of measuring the mechanical operation. However, since it is impossible to make such alterations in all apparatuses, there is a problem in the confirmation of the operation when filing apparatuses are mass-produced in a factory.

Since many filing apparatuses are originally accommodated in computers when they are used, in order to measure the operation of a filing apparatus while it is actually used, it is necessary to make a hole in the box body of the computer accommodating the filing apparatus, or to remove the cover of the box body, which makes the measuring operation troublesome. In addition, since a hole is made or the lid is removed, the environment in which the operation is measured is different from the actual environment, which makes accurate measurement of the operation impossible. For example, if an extra cable is attached to the apparatus in order to measure the operation of the apparatus, the influence of the cable cannot be disregarded, especially when the size of the box body is small, so that it is impossible to accurately measure the actual operation of the apparatus.

Furthermore, when the apparatus has operation trouble, it is necessary to remove the cover sheet or to solder a cable in order to confirm the operation on the spot, which may result in a flaw of the apparatus itself and, hence, a degradation of a commercial value.

SUMMARY OF THE INVENTION

Accordingly, it is a first object of the present invention to eliminate the above-described problems in the related art and to provide a developing system and a developing device for a filing apparatus which is capable of developing firmware of an MCU in a novel filing apparatus at a high speed without delay by using an existent filing apparatus.

It is a second object of the present invention to provide a developing system for a filing apparatus which is capable of developing firmware of a novel MCU by combination of an existent filing apparatus, a developing apparatus and a connecting device for connecting the filing apparatus and the developing apparatus even if the parts such as a DE (disk enclosure) and a demodulator circuit which have no relationship with the MCU are not prepared or created.

It is a third object of the present invention to provide a developing system which is capable of developing firmware for education such as a research and an experiment of a control system (MCU) for a filing apparatus.

It is a fourth object of the present invention to provide a developing system which is capable of developing firmware of an MCU by a computer which is connected to a developing apparatus.

It is a fifth object of the present invention to provide a measuring system for a filing apparatus which facilitates the measurement of the mechanical operation of a filing apparatus, and especially, of a small-sized filing apparatus.

It is a sixth object of the present invention to provide a measuring system which is capable of measuring the mechanical operation of a filing apparatus even if the printed circuit board of the filing apparatus is not exposed to the outside.

To achieve the first and third objects, in a first aspect of the present invention, there is provided a developing device for a filing apparatus for developing firmware of a microcontroller unit which constitutes the filing apparatus, the developing device comprising: a means for supplying and receiving the information about the current head position and the current value to and from an existent filing apparatus; a microcontroller unit (MCU) accommodating firmware which determines the current value to be supplied to a head moving motor of the existent filing apparatus on the basis of the information about the current head position received from the existent filing apparatus; and a monitoring means for monitoring the operation of the existent filing apparatus; wherein the existent filing apparatus drives the motor on the basis of the current value determined by the firmware, the MCU determines the next current value on the basis of the information about the head position received from the existent filing apparatus at regular intervals of time, and the monitoring means monitors and outputs the operation of the existent filing apparatus on the basis of the information about the head position.

To achieve the first and third objects, in a second aspect of the present invention, there is provided a developing system for a filing apparatus for developing firmware of a microcontroller unit (MCU) which constitutes a filing apparatus, the developing system comprising: an existent filing apparatus; and a developing device for developing firmware of the MCU which constitutes a novel filing apparatus; a developing device including a means for supplying and receiving the information about the current head position and the current value to and from the filing apparatus, the microcontroller unit accommodating firmware which determines the current value to be supplied to a head moving motor of the filing apparatus on the basis of the information about the current head position received from the filing apparatus, and a monitoring means for monitoring the operation of the filing apparatus; and the filing apparatus including a means for driving the motor on the basis of the current value supplied from the developing device, and a means for supplying the information about the current head position to the developing device at predetermined intervals of time; wherein the developing device determines the next current value on the basis of the information about the current head position received from the filing apparatus, and monitors and outputs the operation of the filing apparatus on the basis of the information about the head position.

To achieve the second object, in a third aspect of the present invention, there is provided a developing system for a filing apparatus comprising: a connecting device for connecting an existent filing apparatus and a developing device, the connecting device including a storage portion into which information is written by the filing apparatus and from which the information is read by the developing device, and a storage portion into which information is written by the developing device and from which the information is read by the filing apparatus.

To achieve the fourth object, in a fourth aspect of the present invention, there is provided a developing system for a filing apparatus comprising: a computer connected to a developing device through a bus, wherein firmware is transferred from the computer to the developing device, the developing device determines a current value on the basis of the firmware and supplies position information and current value information to the computer and the computer displays the position and the speed of the head on a display screen.

To achieve the fifth object, in a fifth aspect of the present invention, there is provided a measuring system for measuring the mechanical operation of a filing apparatus which accommodates machine parts such as an actuator, the measuring system comprising: the filing apparatus; and an external apparatus such as a personal computer connected to the filing apparatus; the filing apparatus including a mechanical operation controlling means for controlling the mechanical portion of the filing apparatus, a means for measuring various data which indicate the operation of the mechanical portion in time series, a storing means for storing the results of measurement in the form of numeric values, and a means for transferring the results of measurement to the external apparatus via an interface.

Other features and advantages of the present invention will be apparent from the following description taken in conjunction with the accompanying drawings.

BRIEF DESCRIPTION OF THE DRAWINGS

FIG. 3 shows the structure of a sector;

FIG. 11 is an explanatory view of memory data;

FIG. 15 is an explanatory view of processing;

FIG. 25 is an explanatory table of information about a mechanical operation;

FIG. 26 is an explanatory table of trigger identification information;

FIG. 27 is an explanatory table of measurement data identification information;

FIG. 28 is an explanatory table of measuring method designation information;

DESCRIPTION OF THE PREFERRED EMBODIMENTS (A) Schematic explanation of the present invention (a) Developing system of a filing apparatus FIG. 1A schematically explains a developing system for a filing apparatus according to the present invention. In FIG. 1A, the reference numeral 1 denotes an existent filing apparatus, which is, for example, a commercially available product, and 2 represents a developing device for developing firmware of an MCU which is adopted in a novel filing apparatus. In the filing apparatus 1, the reference numeral 1a represents a VCM driving circuit for driving a voice coil motor VCM on the basis of the current value which is supplied from the developing device 2, and 1b a means (MCU) for supplying and receiving the current head position information and the current value at regular intervals of time. In the developing device 2, the reference numeral 2a denotes firmware for determining the current value which is to be supplied to the head moving motor of the filing apparatus 1 on the basis of the current head position information supplied from the filing apparatus 1, and 2b an MCU which accommodates the firmware 2a.

Figure 1A:
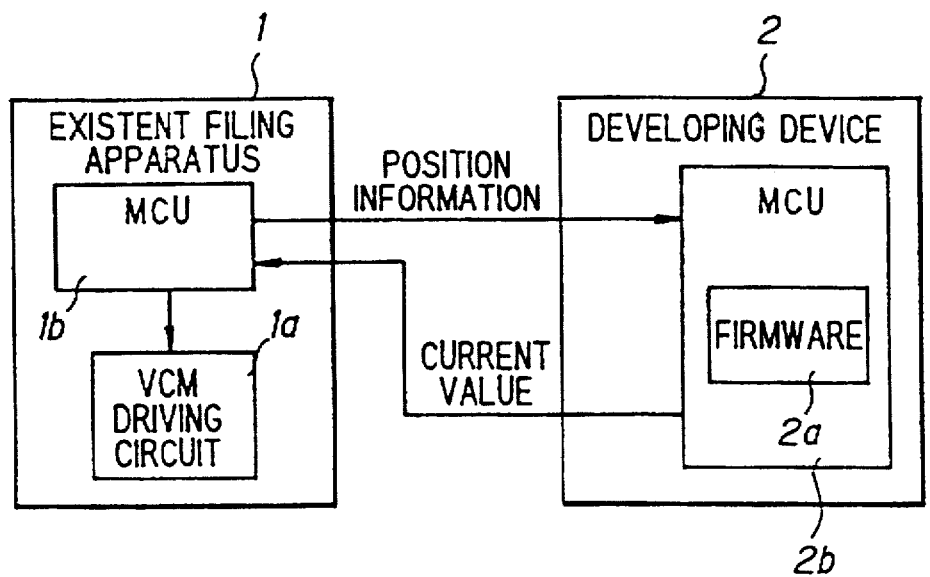
FIG. 1A is a schematic explanatory view of a developing system for a filing apparatus according to the present invention.

The existent filing apparatus 1 transfers the current head position information to the developing device 2 at regular intervals of time. The firmware 2a of the developing device 2 calculates the current value of the voice coil motor VCM for moving the head to a desired position on the basis of the current head position information, and supplies the calculated current value to the filing apparatus 1. The VCM driving circuit 1a of the filing apparatus 1 drives the voice coil motor VCM on the basis of the current value which is supplied from the developing device 2, and the MCU 1b detects the current head position and supplies the current head position information to the developing device 2. The firmware 2a of the developing device 2 determines the next current value on the basis of the head position information which is supplied from the filing apparatus 1. The developing device 2 monitors the operation of the filing apparatus 1 on the basis of the head position information, and creates and modifies the firmware.

According to this structure, all that is mounted on the developing device 2 are the minimum number of circuits which are necessary for the operation of the MCU 2b as an object of research and development, and it is possible to develop the firmware of the MCU at a high speed without delay by using the existent filing apparatus 1. In this case, by mounting the firmware for research and development on the MCU 2b, it is possible to develop not only firmware of the MCU 2b but also the firmware for research and experiment of a control system (MCU) of the filing apparatus.

A connecting device (not shown) for connecting the existent filing apparatus 1 and the developing device 1 is provided therebetween, and a first storage portion into which information is written by the filing apparatus 1 and from which the information is read by the developing device 2, and a second storage portion into which information is written by the developing device and from which the information is read by the filing apparatus 1 are provided in the connecting device, so that information is supplied and received through the first and second storage portions. In this manner, it is possible to develop the firmware of a novel MCU by a combination of the existent filing apparatus 1, the developing device 2 and the connecting device, even if the parts such as a DE and a demodulator circuit which have no relationship with the MCU are not prepared or created. Furthermore, a DA converter for converting the digital position information into analog information is provided in the connecting device so as to display the head position and the head speed on the basis of the output of the DA converter. In this manner, since it is possible to observe the state in which the head is controlled by the firmware, the development of the firmware is facilitated.

The filing apparatus 1 supplies either (1) the type of the filing apparatus 1; or (2) the constants of a servo system in the filing apparatus 1 to the developing device 2. The developing device 2 determines the current value of the motor by using the servo constants corresponding to the type (1) or the servo constants (2) supplied from the filing apparatus 1. In this manner, it is possible to develop a novel MCU in correspondence with each type of filing apparatus to examine the difference in response by varying the servo constants.

A computer connected to the developing device 2 through a bus is provided, and the firmware is transferred from the computer to the developing device 2. The developing device 2 determines the current value on the basis of the firmware. The developing device 2 also supplies head position information and current value information to the computer, and the computer displays the head position and the head speed on the display screen on the basis of the information. The block diagram of the servo control system is input to the computer, and the computer simulates the operation by using the block diagram and compares the result of simulation with the actual position information, the actual speed obtained on the basis of the position information and the current value, thereby developing the firmware. In this manner, it is easy to develop the firmware of an MCU by the computer. If the computer converts the block diagram of the servo control system input thereto into firmware and inputs the firmware to the developing device 2, the development of the firmware is more facilitated.

(b) Measuring system for a filing apparatus

Figure 1B:
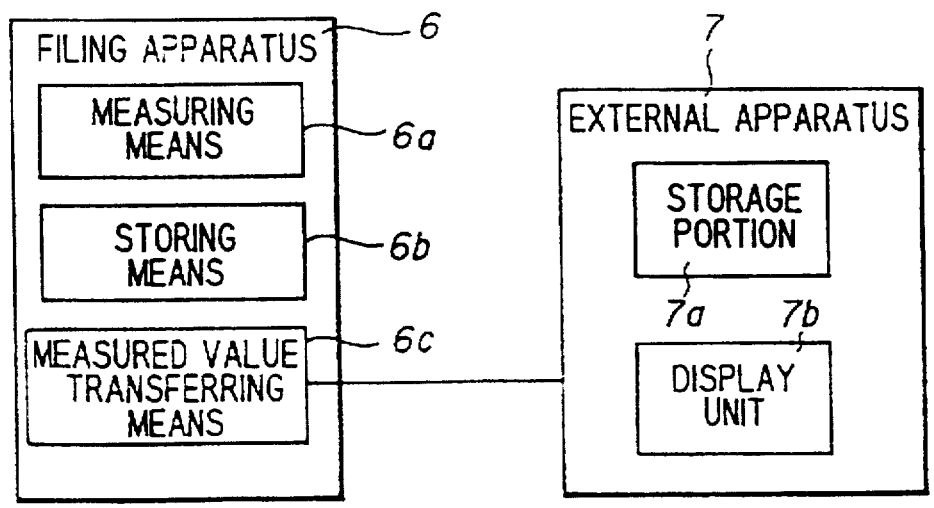
FIG. 1B is a schematic explanatory view of a measuring system for a filing apparatus according to the present invention.

FIG. 1B is a schematic explanatory view of a measuring system for a filing apparatus according to the present invention. In FIG. 1B, the reference numeral 6 represents a filing apparatus, and 7 an external apparatus. In the filing apparatus 6, the reference numeral 6a represents a means for measuring various data in time series which indicate the operation of the mechanical portion of the filing apparatus 6, 6b a storing means for storing the results of the measurement in the form of numeric values, and 6c a means for transferring the results of the measurement to the external apparatus 7 via an interface. In the external apparatus 7, the reference numeral 7a represents a storage portion for storing the transferred measured values, and 7c a display unit for displaying the measured values.

The measuring means 6a measures various data in time series which indicate the operation of the mechanical portion of the filing apparatus 6, the storing means 6b stores the results of measurement in the form of the numeric values, and the means 6c transfers the results of the measurement to the external apparatus 7 via an interface. In this case, the storing means 6b stores various data at a plurality of latest times. The measuring means 6a measures data when a predetermined designated trigger among a plurality of triggers for starting measurement emerges, and stores the measured values. The measuring means 6a also measures data of a predetermined designated object among a plurality of objects of measurement and stores the measured values.

According to this structure, it is easy to measure the mechanical operation of a filing apparatus, especially of a small-sized filing apparatus. In addition, even if the printed circuit board is not exposed to the outside, it is possible to measure the mechanical operation of the filing apparatus.

The measuring means 6a measures data before any trigger for starting measurement emerges, and the storing means 6b stores the measured values for the latest designated times. The storing means 6b is provided with an area for cyclically storing the measured values for the designated times before the trigger for starting measurement emerges, and an area for storing the measured values after the trigger for starting measurement emerges, and the transferring means 6c transfers the measured values to the external apparatus 7 at the request thereof after arranging the measured values stored in the storing means 6b in the order of time series. In this manner, even if a trigger for starting measurement emerges while the measured values are changing, it is possible to store the newly measured values in addition to the existent measured values and output the total measured values to the external apparatus 7.

The external apparatus 7 stores and displays the received measured values. In this manner, it is possible to judge the state of the filing apparatus and detect a position at which trouble is caused by referring to the measured values. The external apparatus 7 also analyzes the measured values, determines the control constants of the mechanical operation controlling means provided within the filing apparatus 6, and sets the control constants in the controlling means. In this manner, it is possible to optimally adjust the mechanical operation on the basis of the measured values. Furthermore, a simulation function is provided for the external apparatus 7, and the results of the simulation of a controlling means for operating an actuator and a motor and the measured results are simultaneously displayed. In this manner, it is possible to adjust the mechanical operation so as to be coincident with the results of the simulation by comparing the results of simulation with the measured results.

A plurality of filing apparatuses are connected to the external apparatus 7, and the external apparatus 7 reads the measured values from the respective filing apparatuses when the filing apparatuses execute predetermined operations. In this manner, the external apparatus 7 compares the measured value of each filing apparatus with a preset standard value, and when the measured value exceeds the standard value beyond a permissible range, the external apparatus 7 can report the corresponding filing apparatus as a defective product.

It is also possible to connect the filing apparatus 6 and the external apparatus 7 through a communicating means such as a personal computer network so as to enable the operation of the filing apparatus 7 to be measured at a remote place. In this case, the external apparatus 7 analyzes the measured values received through the communicating means, and determines the control parameter of the mechanical operation controlling means provided within the filing apparatus 6 and sets the control parameter in the control means of the filing apparatus 6 via the communicating means. In this manner, it is possible to optimally adjust the mechanical operation on the basis of the measured values.

Figure 2:
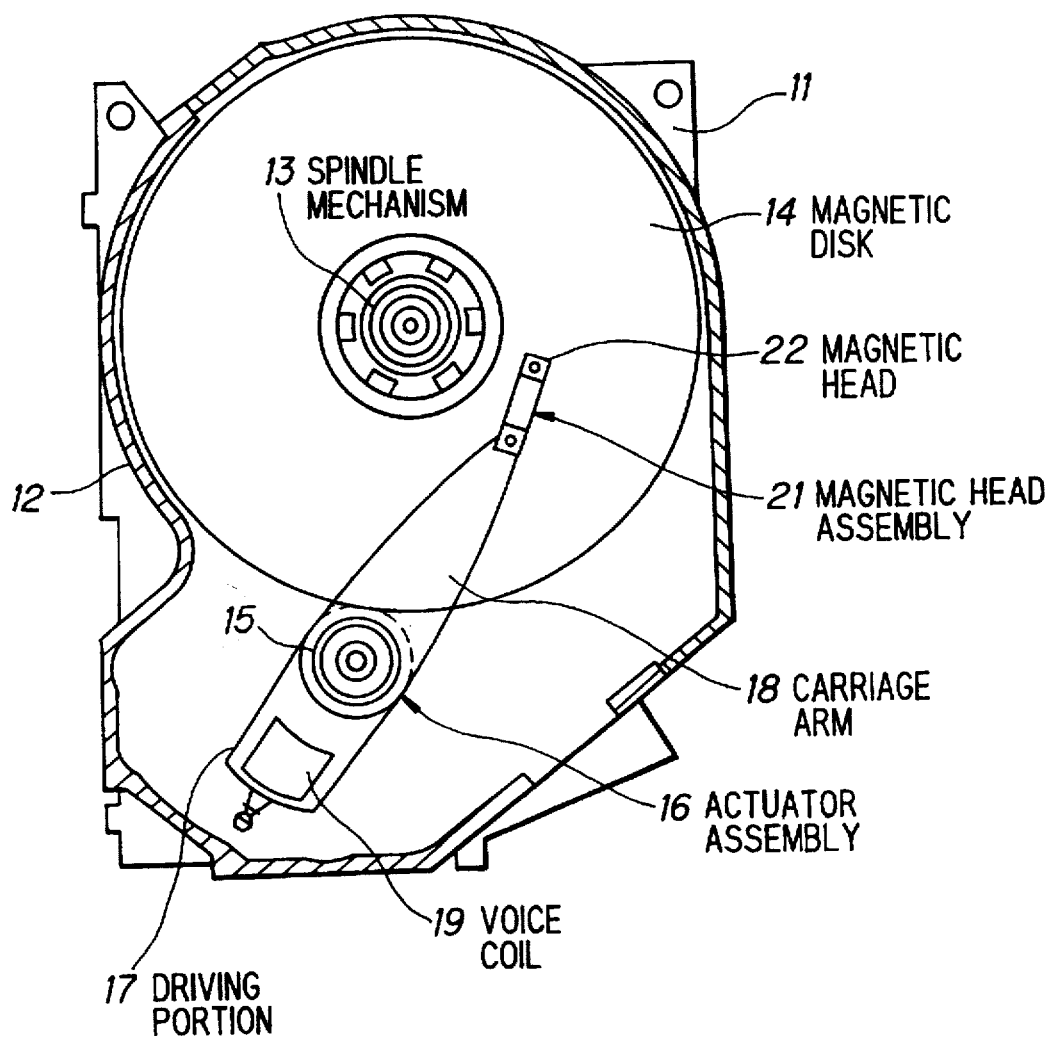
FIG. 2 shows the structure of a magnetic disk.

(B) Embodiment of a developing system for a filing apparatus (a) Explanation of a magnetic disk apparatus (a-1) Structure FIG. 2 shows the structure of a magnetic disk apparatus. In FIG. 2, the reference numeral 11 represents a cover, and 12 a base. A predetermined number of magnetic disks 14, which are recording media, are attached to a spindle mechanism 13 in parallel with each other at regular intervals, and an actuator assembly 16 which can be freely rotated by a rotary shaft 15 is provided in the vicinity of the magnetic disk 14. The actuator assembly 16 is composed of a driving portion (actuator) 17 on one side of the rotary shaft 15 and a carriage arm 18 on the other side. The driving portion 17 is provided with a voice coil 19 which constitutes a voice coil motor. The same number of carriage arms 18 as the number of the magnetic disks 14 are provided, and a magnetic head assembly 21 is attached to one side or both sides of an adapter plate 20 provided at the end of the carriage arm 18. The carriage arm 18 positions a magnetic head 22 at a predetermined position in the radial direction of the magnetic disk 14.

Figure 4A:
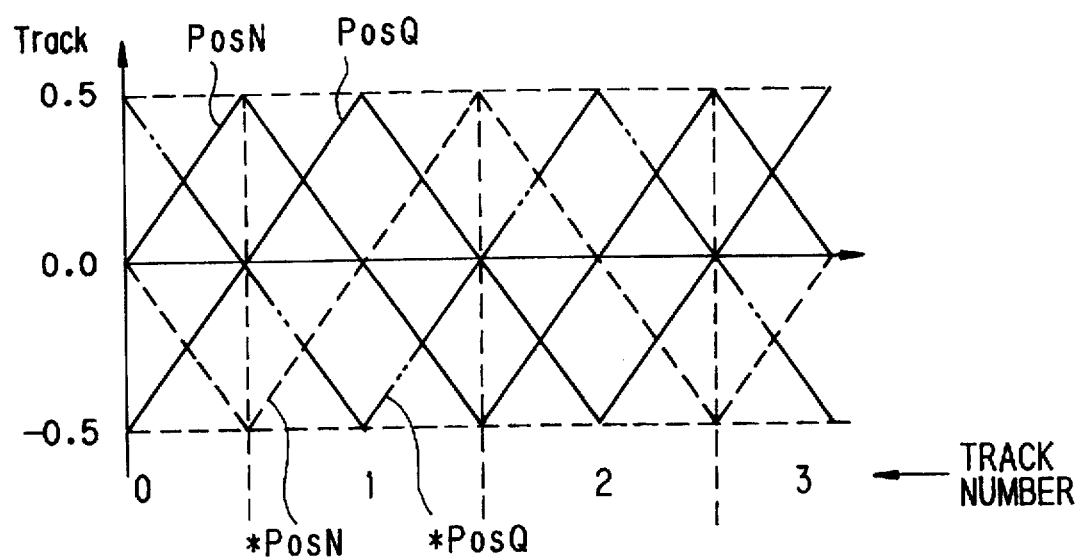
FIGS. 4A and 4B are explanatory views of position signals PosN, PosQ and a position deviation signal.

A multiplicity of tracks are formed on the surface of the magnetic disk 14, and each track is divided into a plurality of sectors. Each sector is provided with a servo area SVA and a data area DTA, as shown in FIG. 3, and a sector mark (servo mark) SM, a track number TNO, and a position information pattern PPT are recorded in the servo area SVA. When a position information pattern signal (head output) read by the magnetic head 22 which moves in the radial direction is passed through a demodulator circuit, two triangular position signals PosN and PosQ which alternate in the transverse direction of the track and which are spaced at π/2 (½ of the track width) phase intervals are obtained, as indicated by the solid lines in FIG. 4A. In order to produce the position signals PosN and PosQ, four position information pattern signals PosA, PosB, PosC and PosD (not shown) are recorded on the medium, and it is possible to produce the position signals PosN and PosQ by the demodulator circuit from the following formulas by using these signals:

PosN=PosA−PosB

PosQ=PosC−PosD.

Figure 4B:
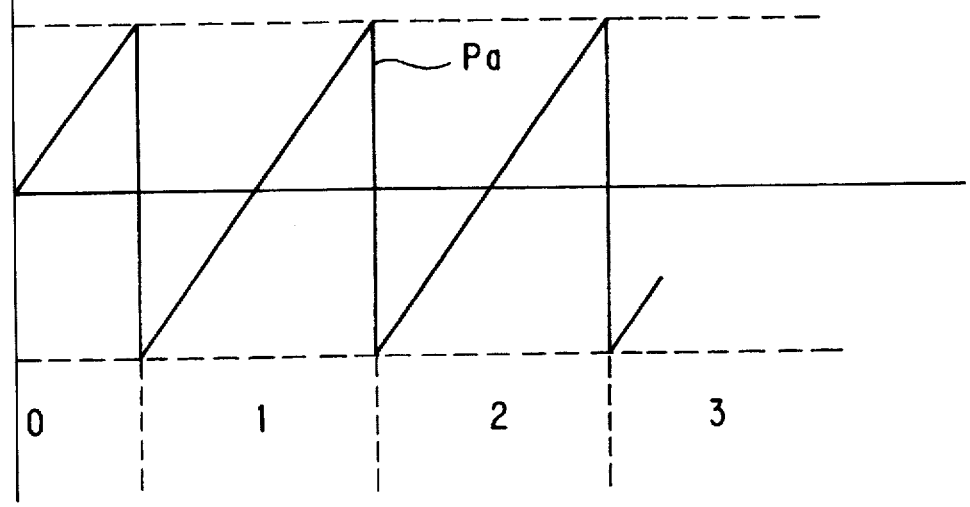

It is also possible to produce a sawtooth position signal (position deviation signal indicating the deviation from the center of the track) Pa by sequentially selecting the position signals PosN and PosQ and the inverted position signals *PosN and *PosQ, as shown in FIG. 4B.

(a-2) Servo circuit

Figure 5:
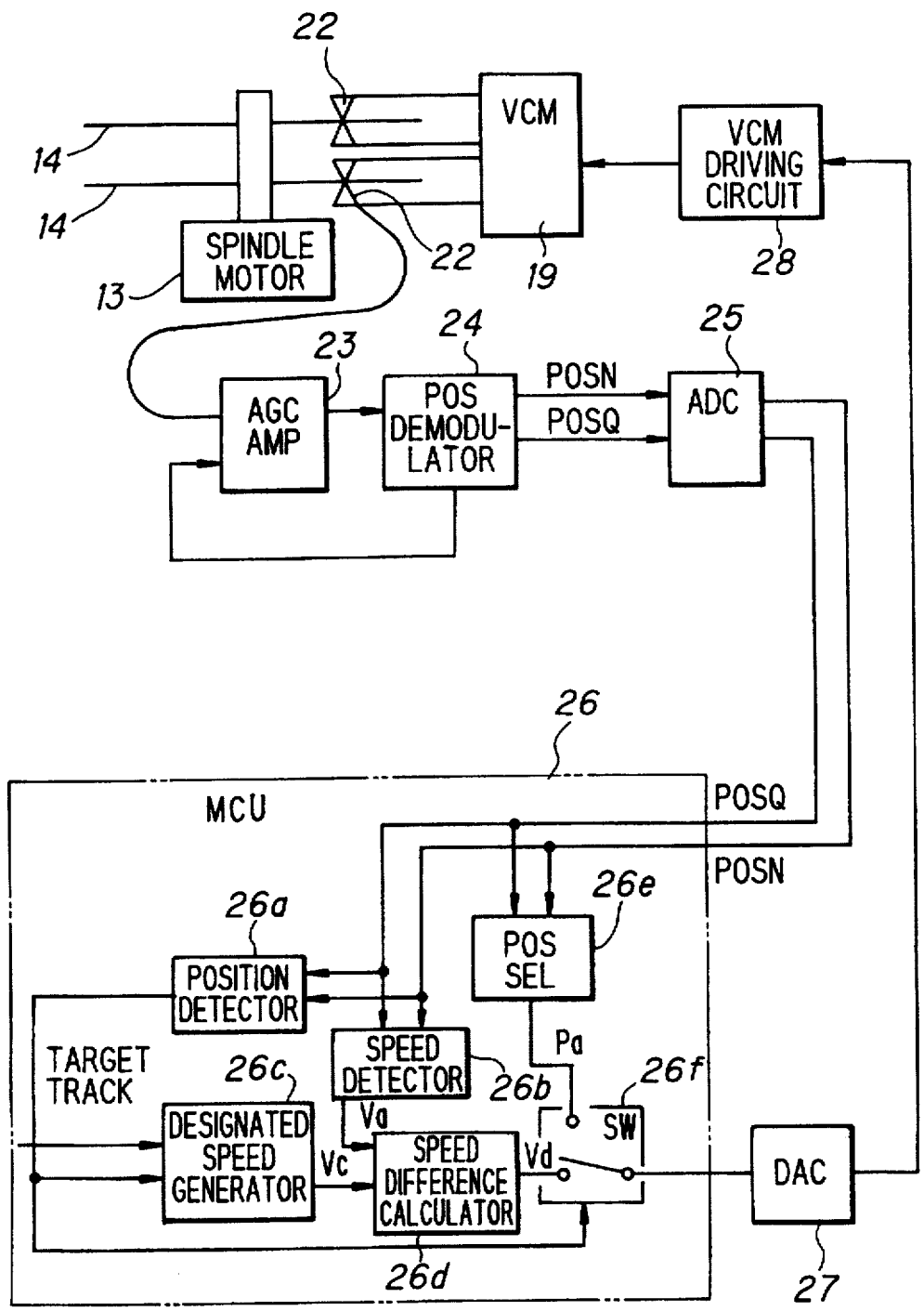
FIG. 5 shows the structure of a servo circuit.

FIG. 5 shows a servo circuit for positioning the head at a target position. In FIG. 5, the reference numeral 13 represents a spindle motor, 14 a magnetic disk rotated by the spindle motor 13, 19 a rotary voice coil motor (VCM) for moving the magnetic head in the radial direction, and 22 a magnetic head for reading/writing data.

The reference numeral 23 denotes an AGC amplifier for automatically controlling the gain of a signal read by the head 22 so that the level is constant. The amplitude of the position information pattern signal which is read from the servo area by the magnetic head 22 becomes lower as the head 22 moves toward the inner periphery of the disk 14. The automatic gain control by the AGC amplifier 23 which makes the average output constant prevents this, so that the position-voltage conversion gain becomes constant irrespective of the position. The reference numeral 24 represents a position signal demodulator which demodulates the position information pattern signals read by the magnetic head 22 so as to output the two position signals PosN, PosQ which have a phase difference of $\pi/2$ each other. The reference numeral 25 denotes an AD converter for converting the position signals PosN, PosQ output from the demodulator 24 into digital values, and 26 a microcontroller unit (MCU) for outputting a designated current value for driving the VCM 19 as a result of servo control, which will be described later, 27 a DA converter for converting the digital designated current value into an analog value, and 28 a VCM driving circuit.

The MCU 26 conducts servo control by the firmware provided therein, and outputs a designated current value for driving the VCM 19. A block diagram of the processing function of the firmware is shown in FIG. 5. In FIG. 5, the reference numeral 26a represents a position detector for detecting the track at which the head 22 is currently situated by using the two position signals PosN, PosQ and a track No., 26b a speed detector for detecting the actual speed Va by differentiating the position signals PosN, PosQ, 26c a designated speed generator for outputting a predetermined designated speed Vc on the basis of the number of tracks between the track at which the head 22 is currently situated and the target track, 26d a speed difference calculator for outputting a difference signal Vd indicating the difference between the designated speed Vc and the actual speed Va, 26e a position signal selector for outputting the position deviation signal Pa shown in FIG. 4B by sequentially selecting the position signals PosN and PosQ and the inverted position signals *PosN and *PosQ, and 26f a switching portion for outputting the designated current value which corresponds to the speed difference signal Vd output from the speed difference calculator 26 until the head 22 reaches the target track, and outputting the designated current value which corresponds to the position signal (position deviation signal indicating the deviation from the center of the track) Pa when the head 22 reaches the target track.

When the target track is input, the designated speed generator 26c generates the designated speed Vc on the basis of the number of tracks between the track at which the head 22 is currently situated and the target track. The switching portion 26f selects the speed difference signal Vd and outputs it as the designated current value for the voice coil motor 19. The voice coil motor 19 then starts to rotate and moves the head 22 toward the target track at the designated speed. The head reads and outputs the signals of the position information pattern PPT recorded in the servo area while moving. The read signals (head outputs) of the position information pattern PPT are input to the position signal demodulator 24, and the position signals PosN, PosQ are demodulated and input to the MCU 26. By using the position signals PosN, PosQ, the position detector 26a updates the track at which the head 22 is currently situated, the speed detector 26b detects the actual speed of the head 22 and the position signal selector 26e outputs the position deviation signal Pa.

The designated speed generator 26c generates the designated speed Vc again on the basis of the number of tracks between the track at which the head 22 is currently situated and the target track, and the speed difference calculator 26d outputs the difference signal Vd indicating the difference between the designated speed Vc and the actual speed Va. The switching portion 26f selects and outputs the speed difference signal Vd, and thereafter the same operation is repeated, so that the head 22 approaches the target track.

When the head 22 reaches the target track, the switching portion 26f switches the speed control over to the position control, selects the position deviation signal Pa output from the position signal selector 26e and outputs it as the designated current value. The designated current value is converted into an analog value and input to the voice coil motor 19. The voice coil motor 19 then rotates so that the head 22 is situated at the center of the track. The head position is controlled by the position control based on the position deviation signal Pa and, finally, the head 22 is positioned at the center of the target track. Thereafter, tracking servo control is executed so that the head 22 is situated at the center of the track.

The servo control is continuously executed in the above explanation. Actually, however, the MCU 26 discretely executes the servo control at every predetermined sampling time. To state this concretely, a servo mark SM is recorded in the servo area SVA of each sector, and servo interruption occurs in the MCU 26 every time the servo mark SM is read. When the servo interruption occurs, the MCU 26 fetches the position signals PosN, PosQ and executes the above-described processing on the basis of the position signals PosN, PosQ. In other words, the period of servo interruption constitutes the sampling period, and the discrete servo control is executed at every sampling.

(a-3) Block diagram of a servo circuit

The voice coil motor VCM moves the magnetic head to the target track when a current is supplied thereto. The position y of the magnetic head is proportional to the double integral of the current u, as represented by the following formula:

$$y=(BL/m)\int\int u\, dt^2$$

wherein B is a flux density, L a coil length, and m the weight of a coil.

If the initial value is set to be 0 after the Laplace transformation of the above formula, the following formula holds:

$$(y/u)=(BL/ms^2).$$

In this manner, the relation between the current and the position is represented by the above formula which utilizes a Laplace operator s. As the characteristic of the VCM, which is the object of control, is represented by the Laplace operator s, so the characteristic of the compensator which executes control can be represented by the Laplace operator s.

Figure 6:
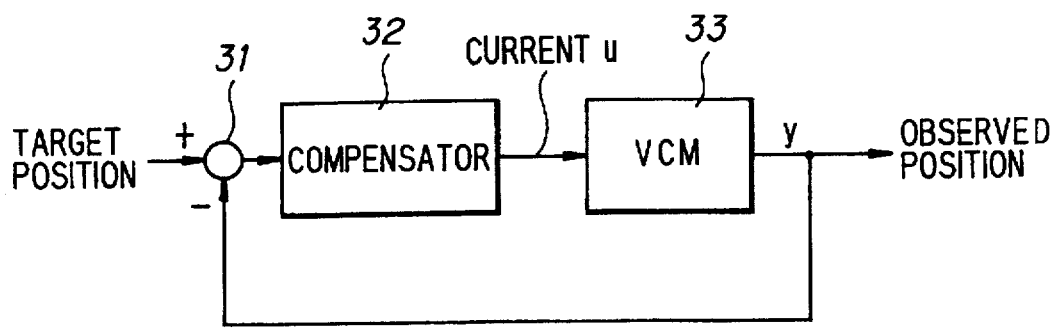
FIG. 6 is a block diagram of a position control system.

FIG. 6 is a block diagram of the position control system in FIG. 5. In FIG. 6, the reference numeral 31 represents a calculator for outputting a designated current which corresponds to the difference between the target head position and the current head position, 32 a compensator and 33 a voice coil motor. The transfer function of the compensator 32 is $(s+\omega_1)/(s+\omega_2)$ in the case of a lead/lag filter type, $K\{(s+\omega_1)/s\}\cdot\{(s+\omega_2)/(s+\omega_3)\}$ in the case of a combination of a PI regulator type and a lead/lag filter type, and $K(s^2+2\zeta\omega s+\omega^2)/s$ in the case of a PID regulator type. There is also a compensator which utilizes an observer. In the above formulas, the symbols $\omega_1$ to $\omega_3$ and K are servo constants.

Figure 7:
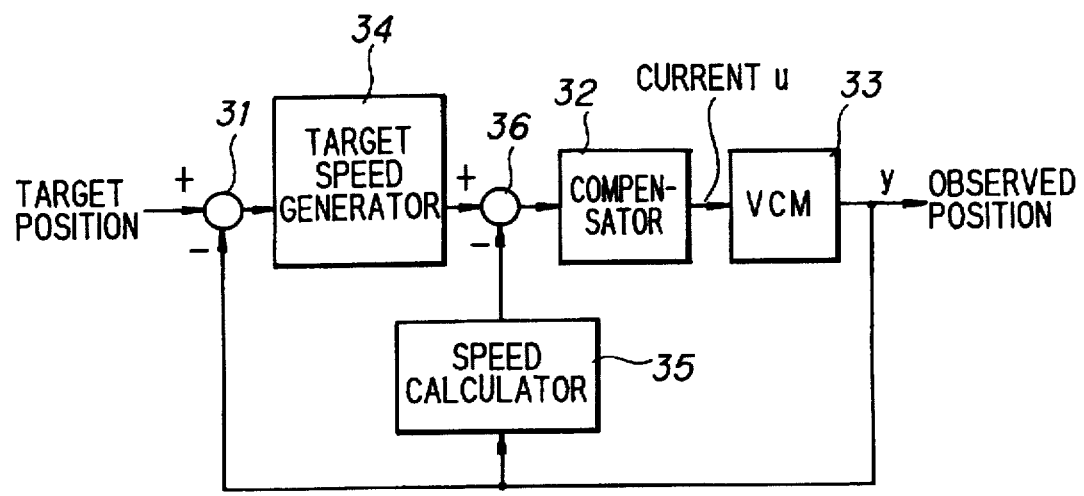
FIG. 7 is a block diagram of a speed control system.

FIG. 7 is a block diagram of the speed control system at the time of seek control. In FIG. 7, the reference numeral 34 represents a target speed generator for generating the target speed (designated speed) which corresponds to the difference between the current head position and the target head position, 35 a speed calculator for calculating the actual speed of the head on the basis of the observed position signals, and 36 a calculator for outputting the designated current value which corresponds to the difference between the target speed and the actual speed. The speed calculator 35 calculates the actual speed from the head position at the preceding sampling time and the head position at the current sampling time. The calculator 36 obtains the difference between the target speed and the actual speed and inputs the speed difference to the compensator 32 as the designated current value. The compensator 32 calculates the designated current value to be supplied to the voice coil motor and supplies the current obtained to the voice coil motor.

The transfer function of the compensator 32 is represented by a polynomial of a Laplace operator s. For example, it is represented by K (constant)

or a PI regulator type, namely, $K(s+\omega)/s$.

The actual speed V(k) at the current sampling time k is calculated from the following formula:

$V(k)=X(k)-X(k-1)$ on the assumption that the head position at the preceding sampling time (k−1) is X(k−1) and the head position at the current sampling time k is X(k).

As described above, it is possible to control the voice coil motor by receiving position information and supplying the current value to the voice coil motor.

(b) Entire structure of a developing system of the invention

Figure 8:
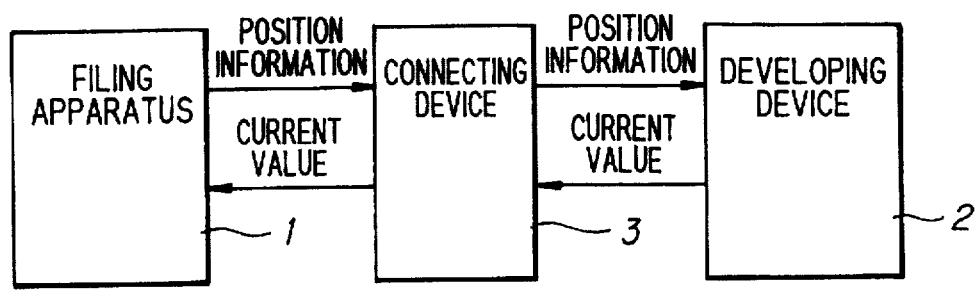
FIG. 8 shows a developing system for a filing apparatus according to the present invention.

FIG. 8 shows the entire structure of a developing system for a filing apparatus according to the present invention. In FIG. 8, the reference numeral 1 denotes an existent filing apparatus, which is, for example, a commercially available product, 2 represents a developing device for developing firmware of an MCU which is adopted in a novel filing apparatus or firmware for research or education, and 3 a connecting device for connecting the filing apparatus 1 and the developing device 2. The existent filing apparatus 1 transfers the head position information to the developing device 2 via the connecting device 3 and drives the voice coil motor on the basis of the current value which is supplied from the developing device 2. The developing device 2 calculates the designated current value for driving the voice coil motor on the basis of the head position information which is supplied from the filing apparatus 1, and transfers the designated current value to the existent filing apparatus 1 via the connecting device 3.

When a novel MCU which is operated at a higher speed and with which a lower consumptive electric is provided and utilized, it has become necessary to adopt the novel MCU in place of a conventional MCU which is mounted on an existent filing apparatus. In this case, it is necessary to develop firmware for the novel MCU.

The function of the MCU of a commercially available filing apparatus is suppressed to the minimum so as to hold down the cost. In a filing apparatus for education and research, however, since there is no restriction in cost, complicated control is possible. In this case, if a novel MCU which is operated at a higher speed and with a lower consumptive electric is provided, it is also necessary to develop firmware which enables complicated control by using the novel MCU. Accordingly, a firmware is developed in the present invention by using an existent filing apparatus.

Firmware for servo control in a filing apparatus generally calculates and outputs a designated current value for driving a voice coil motor on the basis of position information. Therefore, if head position information is output from the filing apparatus to an external apparatus, and the external apparatus calculates the designated current value and supplies it to the filing apparatus, it is possible to develop firmware by the external apparatus. In FIG. 8, (1) the existent filing apparatus 1 detects the head position information and transfers it to the developing device 2. (2) The developing device 2 calculates the designated current value on the basis of the head position information, and transfers the designated current value to the existent filing apparatus 1. (3) The filing apparatus 1 drives the voice coil motor on the basis of the designated current value supplied from the developing device 2. (4) The filing apparatus 1 and the developing device 2 repeat the above operation every time a servo interruption occurs.

In this manner, the servo control of the existent filing apparatus 1 is possible under the control of the developing device 2. In other words, if a novel MCU is mounted on the developing device 2 and the MCU is operated in accordance with the firmware, the firmware can control the existent filing apparatus 1 by servo control, so that it is possible to develop the firmware. For example, by connecting a means for monitoring the mechanical operation (head position, head speed, etc.) in the existent filing apparatus 1 to the developing device 2, it is possible to judge the state of the firmware of the developing device 2 and to detect a portion to be ameliorated, and it is thus possible to develop the firmware for the novel MCU.

(c) Existent filing apparatus

Figure 9:
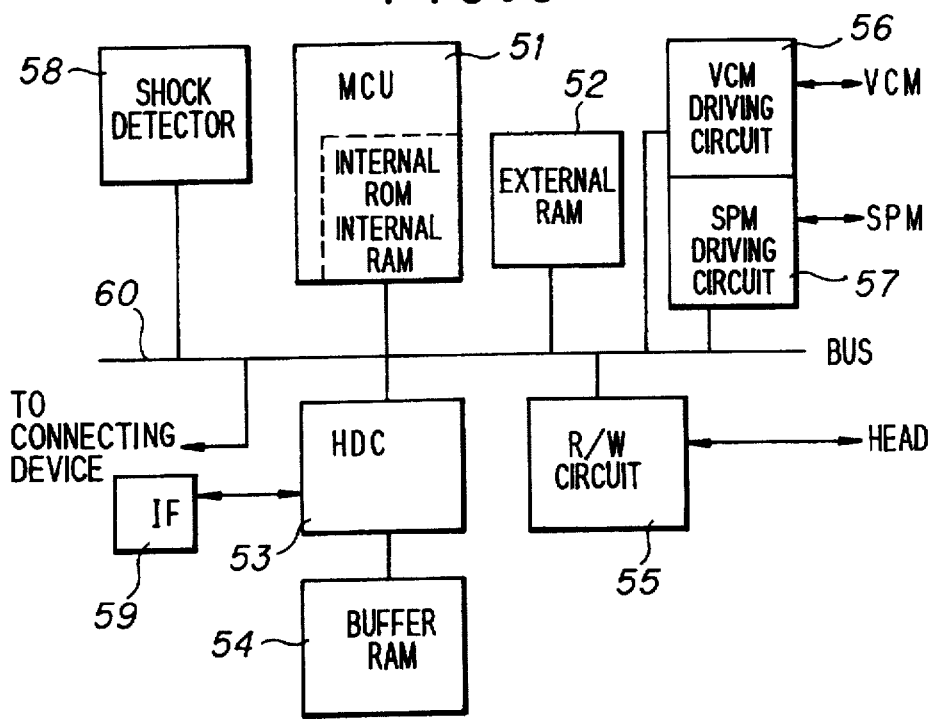
FIG. 9 is a circuit diagram of a magnetic filing apparatus.

FIG. 9 shows the structure of an existent magnetic filing apparatus. In FIG. 9, the reference numeral 51 represents a microcontroller unit (MCU) which executes control such as servo control in the same way as the MCU 26 shown in FIG. 5. A ROM and a RAM are provided within the MCU 51, and various programs including firmware for servo control are stored in the ROM. The reference numeral 52 represents an external RAM, 53 a hard disk controller HDC which is connected to a host apparatus or the like via an interface, 54 a buffer RAM for the HDC, 55 a read/write circuit connected to the head so as to read/write data, 56 a VCM driving circuit for driving the voice coil motor VCM, 57 an SPM driving circuit for driving a spindle motor SPM, and 58 a shock detector for detecting a shock applied to the filing apparatus by a shock sensor which is provided in the shock detector. Since an error in reading/writing data occurs when a shock is applied to the filing apparatus 1, the MCU controls the read/write circuit so as to stop the reading/writing operation when a shock is detected. The reference numeral 59 represents an interface portion between the filing apparatus 1 and the host apparatus. It is possible to supply and receive data to and from each element through a bus 60, and each element is connected to the connecting device 3 shown in FIG. 8 through the bus.

By the program of the MCU 51, (1) the machine parts such as a voice coil motor VCM and the spindle motor SPM are controlled, (2) the read/write circuit 55 is set and controlled, (3) the hard disk controller 53 is so controlled as to supply and receive to and from the host apparatus via the interface portion 59, and (4) position information, current value and command are supplied and received to and from the developing device 2. Since the control of the machine parts such as the voice coil motor VCM and the spindle motor SPM is exerted by the MCU 51, all the mechanical operation is managed as numeric information. The RAM within the MCU 51, the external RAM 52 and the buffer RAM 54 for the HDC are utilized as an area for storing the information about the mechanical operation.

(d) Developing device

Figure 10:
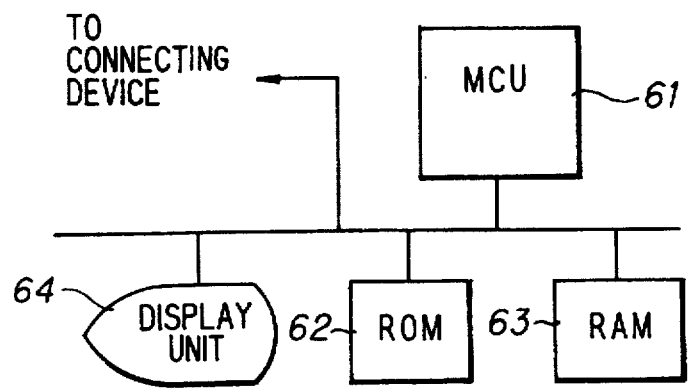
FIG. 10 shows the structure of a developing device according to the present invention.

FIG. 10 shows the structure of the developing device 2. In FIG. 10, the reference numeral 61 denotes an MCU, 62 a ROM, 63 a RAM and 64 a display unit. Each element is connected through a bus so that data can be supplied and received to and from each other. The developing device 2 has the irreducible minimum structure. The developing device 2 is connected to the connecting device 3 shown in FIG. 8 through a bus. A program is stored in the ROM 62, and the MCU 61 supplies and receives information or command to and from the existent filing apparatus 1 in accordance with the program, and calculates the current value in accordance with the firmware for servo control.

In a case where the type of filing apparatus is supplied from the filing apparatus 1 after the power is turned on, (1) various servo constants, (2) sampling time, (3) track width, (4) acceleration constant, (5) maximum current value, etc. are stored in the ROM 62 in correspondence with the type of filing apparatus, as shown in FIG. 11.

(e) Structure of the connecting apparatus

Figures 12, 13:
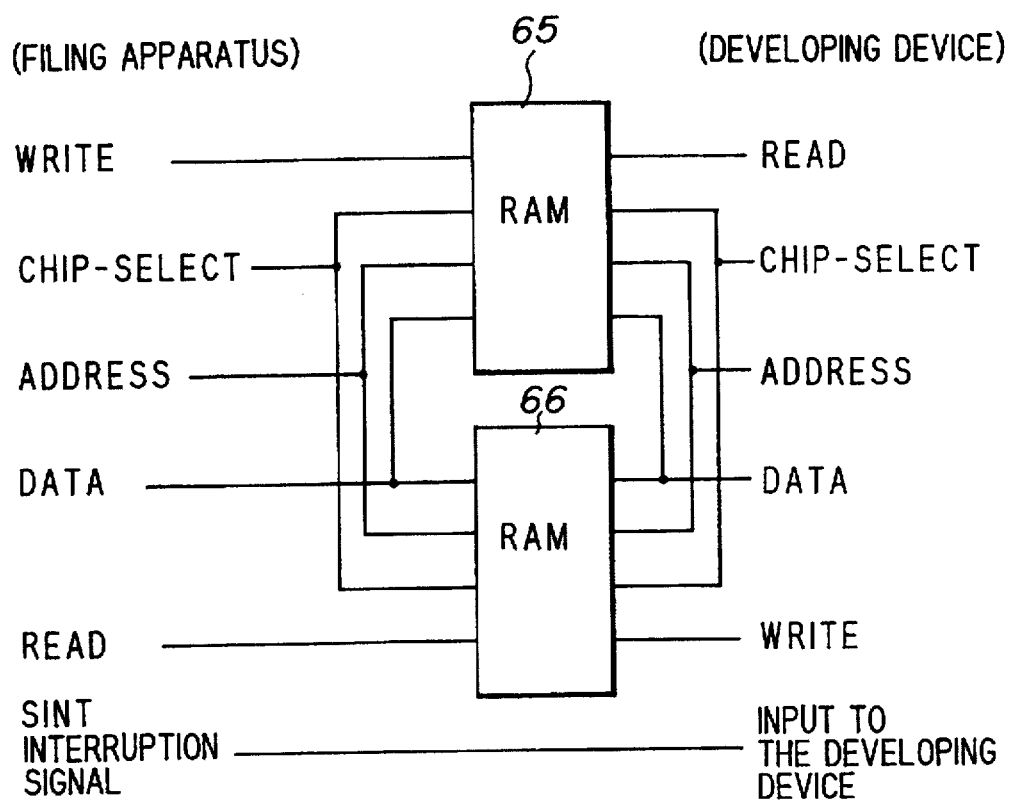
FIG. 12 is a circuit diagram of a connecting device.
FIG. 13 is an explanatory view of the arrangement of information and command in the memories.

FIG. 12 shows the structure of the connecting apparatus 3. In FIG. 12, the reference numeral 65 denotes a first RAM to which information (position information) is written by the filing apparatus 1 and from which the information is read by the developing device 2, and 66 a second RAM to which information (designated current value) is written by the developing device 2 and from which the information is read by the filing apparatus 1. Seen from the filing apparatus 1, the first RAM 65 is a RAM for writing and the second RAM 66 is a RAM for reading. Seen from the developing device 2, the first RAM 65 is a RAM for reading and the second RAM 66 is a RAM for writing.

A servo interruption signal SINT is directly input to the developing device 2 via either of these memories 65, 66.

FIG. 13 is an explanatory view of the memories in which the information and commands supplied and received to and from the filing apparatus 1 and the developing device 2 are stored. Addresses 0 to 5 are addresses in the first RAM 65, and the addresses 6 and 7 are addresses in the second RAM 66.

The information supplied from the filing apparatus 1 to the developing device 2 is position information PosA, PosB, PosC, PosD and the track number, and these data are written at the addresses 0 to 4. Each command CMD1 supplied to the developing device 2 is written at the address 5.

The information supplied from the developing device 2 to the filing apparatus 1 is designated current value, which is written at the address 6. Each command CMD2 supplied to the filing apparatus 1 is written at the address 7.

The command CMD1 supplied from the filing apparatus 1 to the developing device 2 consists of three commands: command PosReq, command CurAcK, and command Drv-Fail which have the following meanings:

(1) Command PosReq

1: Position information has been obtained and set in a register

0: Position information has not been set yet (2) Command CurAcK

1: Current value has been read from the register

0: Current value has not been read yet (3) Command DryFail

1: Error has been caused

2: No error

The developing device 2 constantly monitors whether or not the command CMD1 is written at the address 5, and if it is written, the command CMD1 is read and identified so as to find: (1) that position information is written in the register by the filing apparatus 1; (2) that the current value is read by the filing apparatus or (3) that an error has been caused. If position information is written, it is possible for the developing device 2 to immediately read the information from the register, thereby enabling supply and reception of position information.

The command CMD2 supplied from the developing device 2 to the filing apparatus 1 consists of three commands: command PosAck, command CurReq, and command DrvGo which have the following meanings:

(1) Command PosAck

1: Position information has been read from the register

0: Position information has not been read yet (2) Command CurReq

1: Current value has been set in the register

0: Current value has not been set yet (3) Command DryGo

1: Start the filing apparatus

2: Stop the filing apparatus

The filing apparatus 1 constantly monitors whether or not the command CMD2 is written at the address 7, and if it is written, the command CMD2 is read and identified so as to find: (1) that position information is read from the register by the developing device 2; (2) that the current value is written in the register by the developing device 2; or (3) that the filing apparatus is instructed to start or stop. If the current value is written, it is possible for the filing apparatus 1 to immediately read the current value from the register, thereby enabling supply and reception of the current value.

(f) Operation timing

Figure 14:
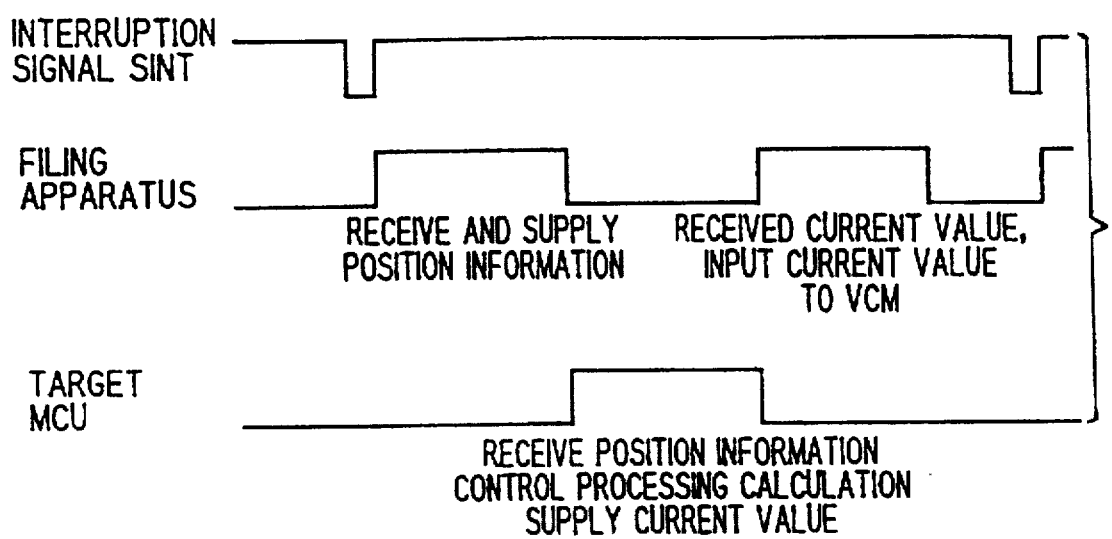
FIG. 14 is an explanatory view of an operation timing.

FIG. 14 is an explanatory view of the operation timing of the filing apparatus 1 and the developing device 2.

When the filing apparatus 1 detects a servo mark, it generates a servo interruption signal SINT. The MCU 51 of the filing apparatus 1 then detects and writes the position information PosA, PosB, PosC, PosD and the track number into the first RAM 65 of the connecting device 3, and sets the command PosReq to "1". When the command PosReq becomes "1", the MCU 61 of the developing device 2 reads the position information PosA, PosB, PosC, PosD and the track number written in the first RAM 65, and sets the command PosAck to "1". The MCU 61 then executes servo control calculation in accordance with the firmware for servo control so as to obtain a designated current value, and writes the designated current value into the second RAM 66. The MCU 61 also sets the command CurReq to "1". When the command CurReq becomes "1", the MCU 51 of the filing apparatus 1 reads the current value written in the second RAM 66, and inputs the designated current value to the VCM driving circuit 56 so as to drive the voice coil motor VCM.

(g) Processing by the filing apparatus and the developing device (g-1) Processing FIG. 15 is a table explaining the processing by the filing apparatus 1 and the developing device 2, wherein the processing is vertically shown in time series.

When an interruption is caused in a servo system (step 101a), the filing apparatus 1 reads the position information PosA, PosB, PosC, PosD and the track number (GRAY cod), confirms that the command PosAck is "0", writes the position information PosA, PosB, PosC, PosD and the track number in the register (first RAM) 65 of the connecting device 3 and sets the command PosReq to "1" (step 102a). The filing apparatus 1 then waits until the command PosAck becomes "1" (step 103a). The control of the rotation of the spindle motor SPM is executed during this waiting time.

On the other hand, when the interruption signal is issued (step 101b) the developing device 2 waits until the command PosReq becomes "1" (step 102b). When the command PosReq becomes "1", the developing device 2 reads the position information PosA, PosB, PosC, PosD and the track number from the first RAM 65, and sets the command PosAck to "1" (step 103b). The developing device 2 then waits until the command PosReq becomes "0" (step 104b).

When the command PosAck becomes "1", the filing apparatus 1 clears the command PosReq to "0" (step 104a), and waits until the command CurReq becomes "1" (step 105a). When the command PosReq becomes "0", the developing device 2 clears the command PosAck to "0", and executes the calculation processing in accordance with the firmware so as to calculate a designated current value. The developing device 2 then confirms that the command CurAck is "0", and thereafter writes the designated current value into the second RAM 66 of the connecting device 3 and sets the command CurReq to "1" (step 105b). The developing device 2 then waits until the command CurAck becomes "1" (step 106b).

When the command CurReq becomes "1", the filing apparatus 1 reads the designated current value from the second RAM 66 of the connecting device 3, and supplies the designated current to the voice coil motor VCM. The filing apparatus 1 also sets the command CurAck to "1" (step 106a). The filing apparatus 1 then waits until the command CurReq becomes "0" (step 107a).

When the command CurAck becomes "1", the developing device 2 clears the command CurReq to "0" (step 107b). When the command CurReq becomes "0", the filing apparatus 1 clears the command CurAck to "0" (step 108a). The filing apparatus 1 then waits until the next servo interruption occurs.

In multirate control which designates current values multiple times at one interruption, the following processing is executed at predetermined intervals of time within one interruption period. After the above processing, the following processing is executed. The developing device 2 estimates the head position after a predetermined time, and executes servo control calculation in accordance with the firmware so as to obtain a designated current value. After confirming that the command CurAck is "0", the developing device 2 writes the designated current value into the second RAM 66 of the connecting device and sets the command CurReq to "1" (step 111b). Thereafter, the developing device 2 waits until the command CurAck becomes "1" (step 112b).

The filing apparatus 1 waits until the command CurReq becomes "1" (step 111a), when the command CurReq becomes "1", the filing apparatus 1 reads the designated current value from the second RAM 66 of the connecting device, and supplies the designated current value to the voice coil motor VCM. The filing apparatus 1 also sets the command CurAck to "1" (step 112a). The filing apparatus 1 then waits until the command CurReq becomes "0" (step 113a).

When the command CurAck becomes "1", the developing device 2 clears the command CurReq to "0" (step 113b). When the command CurReq becomes "0", the filing apparatus 1 clears the command CurAck to "0" (step 114a). The multirate control is thereafter repeated in the same way until the next interruption occurs.

(g-2) Processing by the filing apparatus

Figure 16:
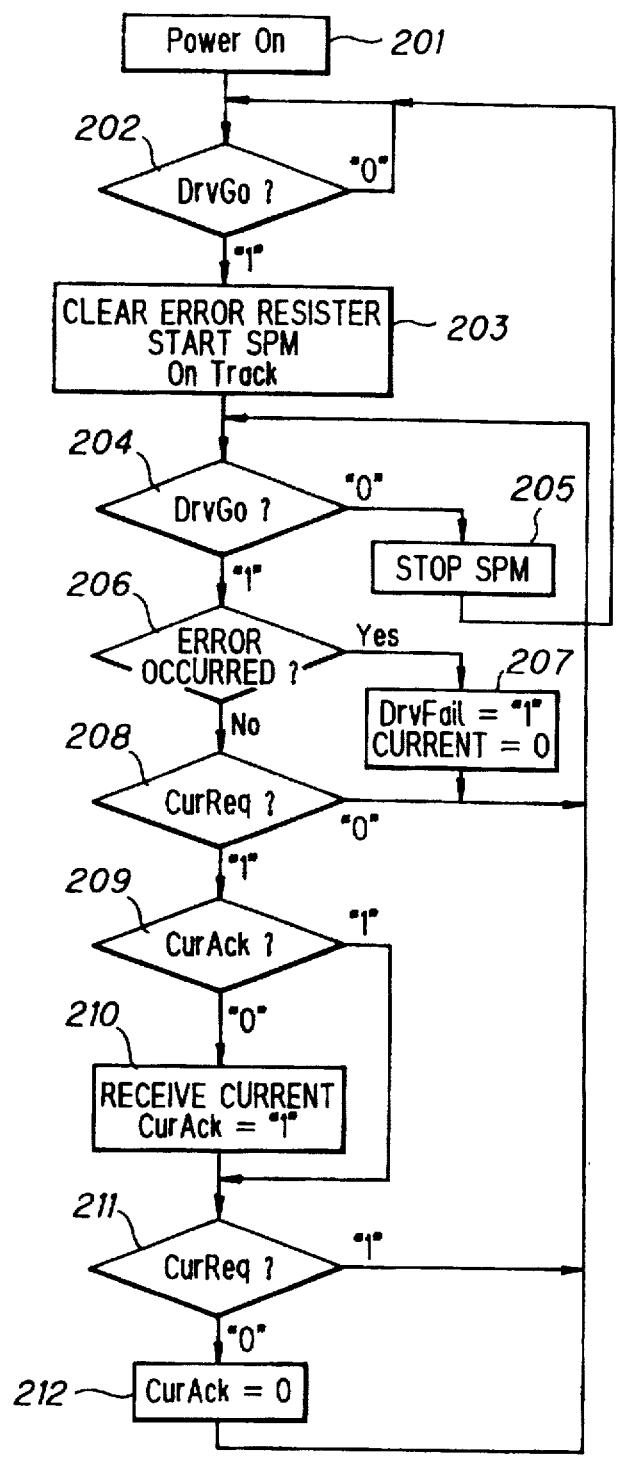
FIG. 16 is a flowchart of background processing of a filing apparatus.
Figure 17:
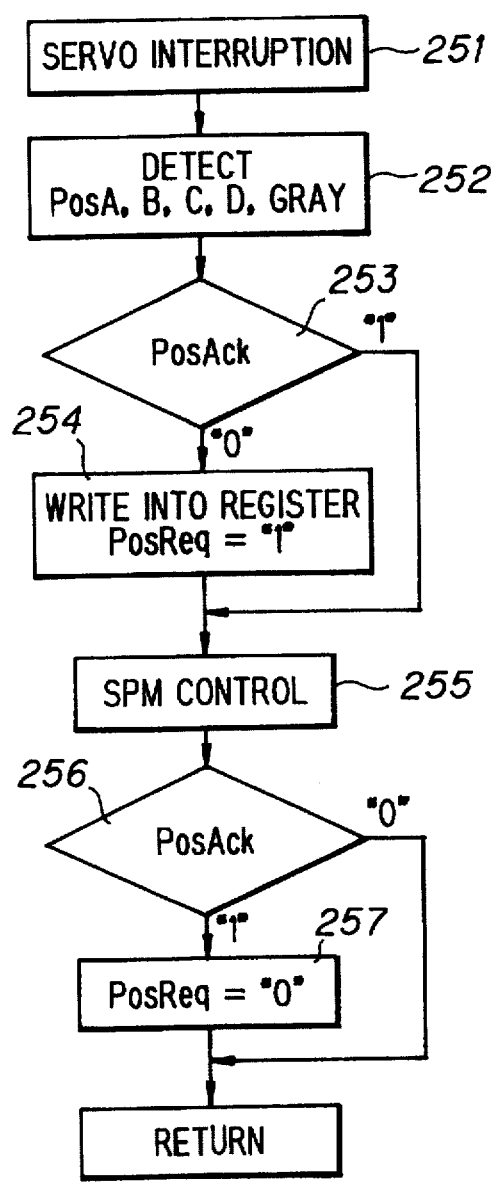
FIG. 17 is a flowchart of foreground processing of a filing apparatus.

FIGS. 16 and 17 are flow charts of the processing by the filing apparatus 1, wherein FIG. 16 is a flow chart of processing (background processing) when the power is ON and the interface processing, and FIG. 17 is a flow chart of processing (foreground processing) when an interruption occurs.

(1) Background processing

When the power is turned on (step 201), the filing apparatus 1 judges whether or not the command DrvGo is "1", in other words, whether or not the developing device 2 has instructed the start of firmware developing control (step 201). When the command DrvGo is "0", in other words, when the start of firmware developing control has not been instructed, the filing apparatus 1 waits until the command DrvGo becomes "1". On the other hand, if the command DrvGo is "1", the filing apparatus 1 clears the contents of an error register, starts the spindle motor SPM and positions the head at the center of the track by tracking servo control (step 203).

The filing apparatus 1 judges again whether or not the command DrvGo is "1" (step 204), and if DrvGo="0", the filing apparatus 1 stops the rotation of the spindle motor SPM (step 205). The process returns to the step 202 and processing at the subsequent steps is executed.

If DrvGo="1", the filing apparatus 1 judges whether or not an error is caused (step 206), and if the answer is "YES", the filing apparatus 1 sets the command DrvFail to "1", writes the command in the connecting device 3, and sets the current of the voice coil motor VCM to zero (step 207). The process then returns to the step 204, and processing at the subsequent steps is executed.

If no error is caused, the filing apparatus 1 judges whether or not the command CurReq is "1" (step 208), and if CurReq="0", the process then returns to the step 204, and processing at the subsequent steps is executed. On the other hand, if CurReq="1", judgement is made as to whether or not the command CurAck is "1" (step 209). If the command CurAck="0", the designated current value is read from the second RAM of the connecting device 3 and the command CurAck is set to "1" (step 210). Thereafter or if the command CurAck="1" at the step 209, judgement is made as to whether or not the command CurReq is "1" (step 211). If CurReq="1", the process then returns to the step 204, and processing at the subsequent steps is executed. If CurReq="0", the command CurAck is set to "0". The process returns to the step 204, and processing at the subsequent steps is executed.

(2) Foreground processing

When a servo interruption occurs (step 251), the filing apparatus 1 detects the position information PosA, PosB, PosC, PosD and the track number (GRAY cord) (step 252). The filing apparatus 1 then judges whether or not the command PosAck is "0" (step 253). If PosAck="0", the filing apparatus 1 writes the position information PosA, PosB, PosC, PosD and the track number into the register (first RAM) 65 of the connecting device 3, and sets the command PosReq to "1" (step 254).

Thereafter or if the command PosAck="1" at the step 253, the spindle motor SPM is controlled (step 255). Judgement is then made as to whether or not the command PosAck is "1" (step 256). If PosAck="0", the filing apparatus 1 waits for the next servo interruption. On the other hand, of PosAck="1", the command PosReq is cleared to "0" (step 257), and the filing apparatus 1 waits for the next servo interruption.

(g-3) Processing by developing device

Figure 18:
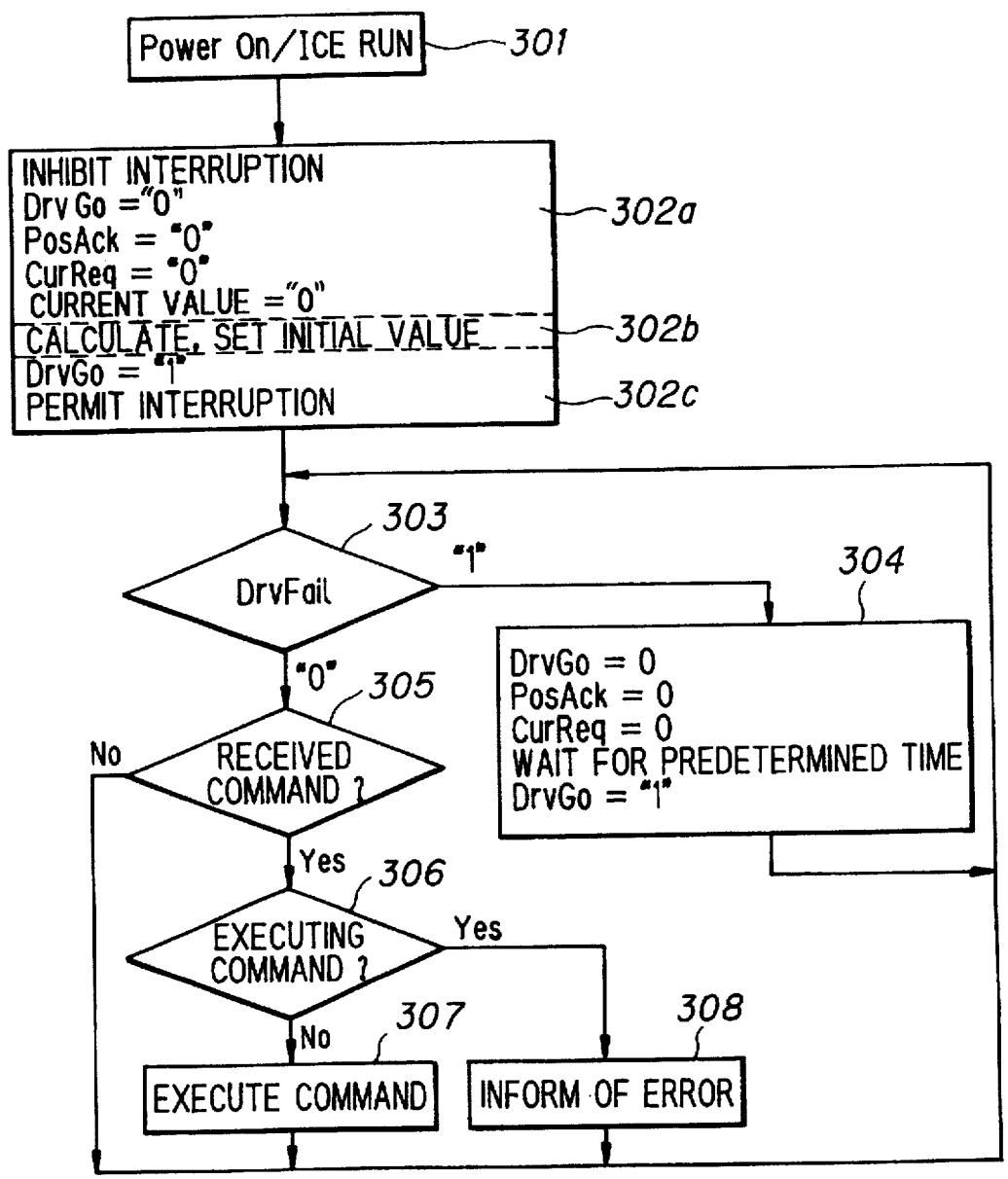
FIG. 18 is a flow chart of processing when the power is ON or the ICE is started.
Figure 19:
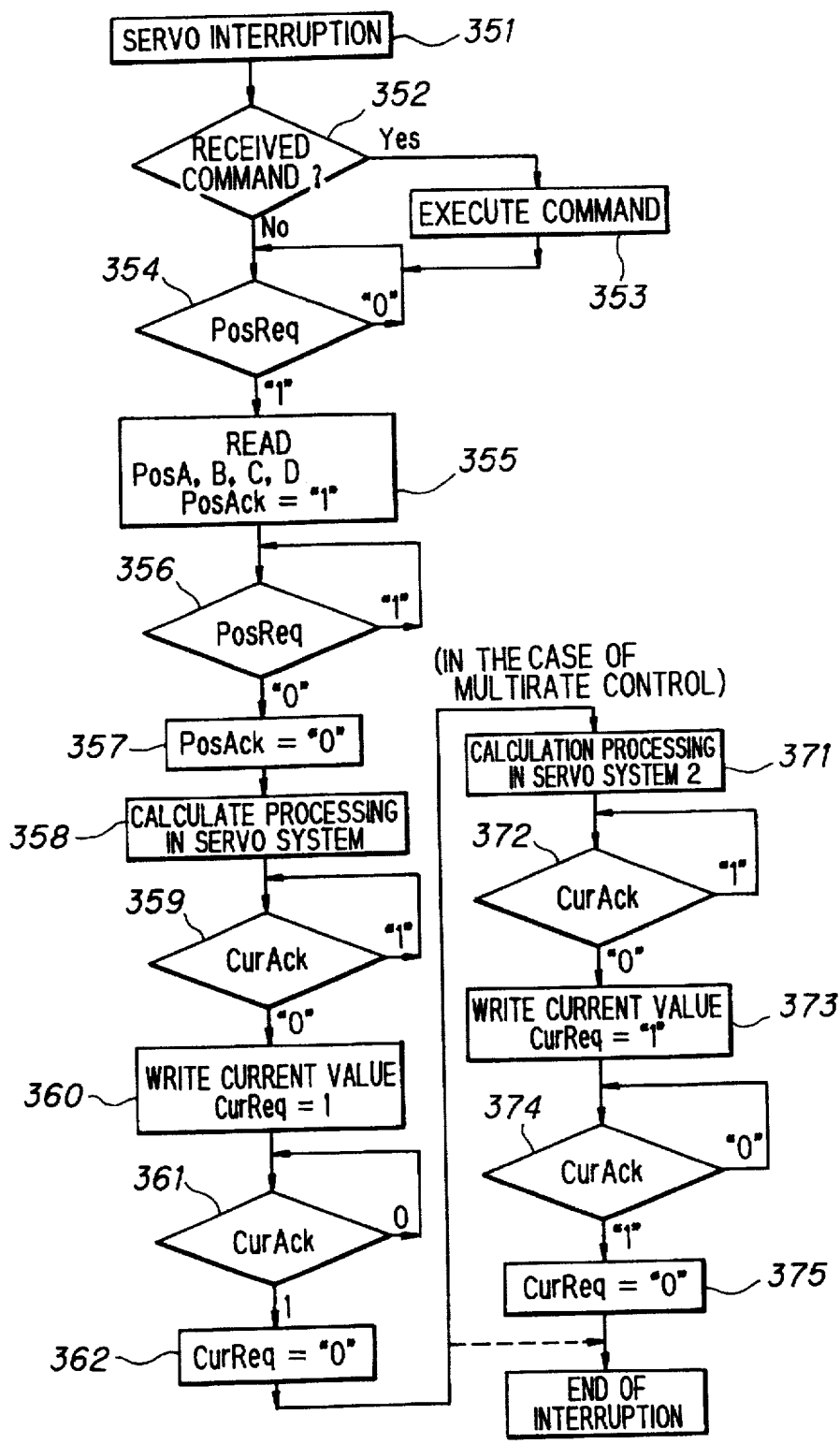
FIG. 19 is a flow chart of processing when interruption is caused in a servo circuit.
Figure 20A:
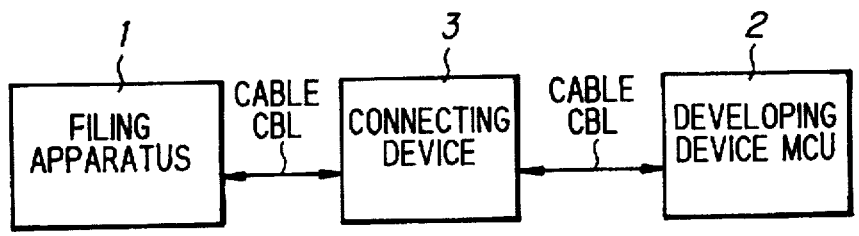
FIGS. 20A, 20B, 20C and 20D are explanatory views of types of developing system for a filing apparatus.
Figure 20B:
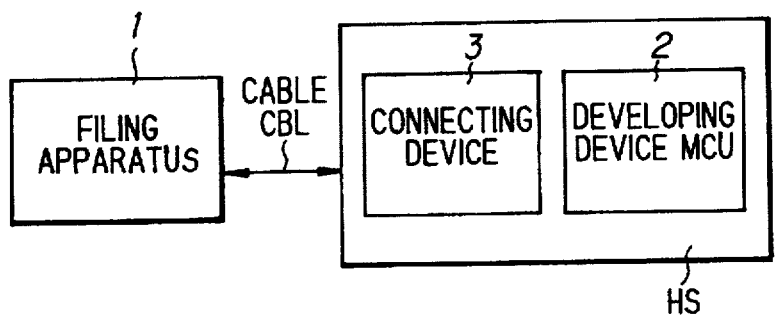
Figure 20C:
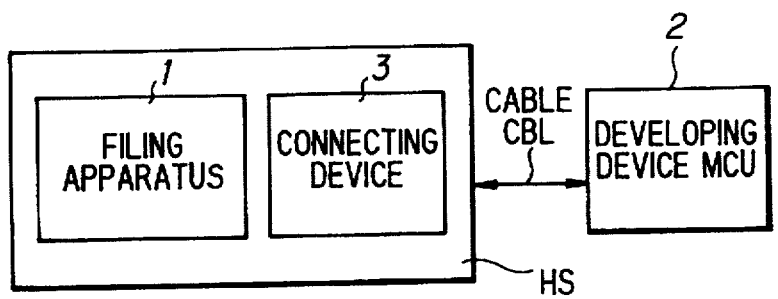
Figure 20D:
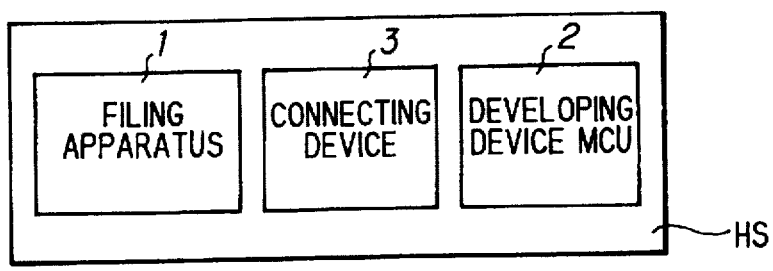

FIGS. 18 and 19 are flow charts of the processing by the developing device 2, wherein FIG. 18 is a flow chart of processing when the power is ON or when an ICE (In-Circuit Emulator) is started, and FIG. 19 is a flow chart of processing when an interruption occurs.

(1) Processing when the power is ON or when an ICE is started

When the power is turned on or the ICE is started (step 301), the developing device 2 inhibits interruption and clears the commands (DryGo, PosAck, CirReq) to "0", and sets the designated current value to "0" (step 302a). The initial value is then calculated and set (step 302b), the command DrvGo is set to "1", and interruption is permitted (step 302c).

Thereafter judgement is made as to whether or not the command DryFail is "1" (step 303), and if DrvFail="1", in other words, if an error is caused in the filing apparatus 1, the commands (DrvGo, PosAck, CirReq) are cleared to "0". After a lapse of a predetermined time, the command DrvGo is set to "1", and the filing apparatus 1 is restarted (step 304). The process returns to the step 303, and processing at the subsequent steps is executed.

On the other hand, if DrvFail="0" at the step 303, in other words, if an error is not caused in the filing apparatus 1, judgement is made as to whether or not a command is received from the filing apparatus 1 (step 305), and if the answer is NO, the process returns to the step 303. If the answer is YES, judgement is made as to whether or not the command is being executed (step 306). If the answer is in the negative, the command is executed (step 307), and the process returns to the step 303. If the answer is in the affirmative, the developing device 2 informs the filing apparatus 1 of the error (step 308), and the process returns to the step 303.

(2) Control at the time of servo interruption

When a servo interruption signal is issued (step 351), judgement is made as to whether or not a command is received (step 352), and if the answer is YES, the command is executed (step 353). If the answer is NO or after the command is executed, the developing device 2 waits until the command PosReq becomes "1" (step 354). When the command PosReq becomes "1", the developing device 2 reads the position information PosA, PosB, PosC, PosD and the track number from the first RAM 65 of the connecting device 3, and sets the command PosAck to "1" (step 355). The developing device 2 then waits until the command PosReq becomes "0" (step 356).

When the command PosReq becomes "0", the developing device 2 clears the command PosAck (step 357), and executes the calculation processing in the servo system in accordance with the firmware so as to calculate a designated current value (step 358). The developing device 2 then confirms that the command CurAck is "0" (step 359), writes the designated current value into the second RAM 66 of the connecting device 3 and sets the command CurReq to "1" (step 360). The developing device 2 then waits until the command CurAck becomes "1" (step 361).

When the command CurAck becomes "1", the developing device 2 clears the command CurReq to "0" (step 362), and waits for the next servo interruption.

In the case of multirate control, the developing device 2 estimates the head position after a predetermined time, and executes servo control calculation in accordance with the firmware so as to obtain a designated current value (step 371). After confirming that the command CurAck is "0" (step 372), the developing device 2 writes the designated current value into the second RAM 66 of the connecting device and sets the command CurReq to "1" (step 373). Thereafter, the developing device 2 waits until the command CurAck becomes "1" (step 374). When the command CurAck becomes "1", the developing device 2 clears the command CurReq to "0" (step 374). The multirate control is thereafter repeated in the same way until the next interruption occurs.

By monitoring the mechanical operation (head position, head speed, etc.) in the filing apparatus 1 by the display unit or the like during the above processing, it is possible to judge the state of the firmware apparatus of the developing device 2 and to detect a portion to be ameliorated, and it is thus possible to develop the firmware for the novel MCU.

Even if a firmware is developed by utilizing a novel MCU, there is actually the case in which the specification of the filing apparatus as the object of commercial production is different from that of the developed firmware. Especially, there is a high possibility of the mechanical specification of an actuator or a motor being different. However, once the structure of the firmware of a servo control system is determined, even if the specification of an actuator or a motor is slightly different, it can be dealt with merely by changing a part of the control constants in the firmware. Therefore, it is possible to develop the firmware of a control system prior to the production of the filing apparatus as the actual object. In addition, it goes without saying that the manner of providing a driving signal and the manner of reading control information are different between the developed firmware and the finally produced circuit. However, if the firmware is composed of a plurality of modules for calculation of a control system, fetching control information and outputting a driving signal, it is possible to replace a module by a module corresponding to the actual circuit when the actual circuit is utilized.

According to this embodiment, the developing device 2 is required to mount the minimum circuits which are necessary for the operation of the MCU as the object of research and development, so that it is possible to develop firmware of the MCU at a high speed without delay by using an existent filing apparatus. In addition, it is possible to develop firmware of a novel MCU by a combination of the existent filing apparatus, the developing device and the connecting device, even if the parts such as a DE and a demodulator circuit which have no relationship with the MCU are not prepared or created.

(h) Types of developing systems for a filing apparatus

The four types shown in FIGS. 20A to 20D will be considered as the types of developing systems for a filing apparatus. In the structure shown in FIG. 20A, the filing apparatus 1, the developing device 2 and the connecting device 3 are connected to each other via a cable CBL as independent devices. In the structure shown in FIG. 20B, the connecting device 3 and the developing device 2 are accommodated in the same box body HS, which is connected to the filing apparatus 1 through the cable CBL. In the structure shown in FIG. 20C, the filing apparatus 1 and the developing device 2 are accommodated in the same box body HS, which is connected to the developing device 2 through the cable CBL. In the structure shown in FIG. 20D, each device is accommodated in the box body HS as one body.

(i) Modifications (i-1) First modification

In the above embodiment, the position information PosA, PosB, PosC, PosD is supplied from the filing apparatus 1 to the developing device 2. Alternatively, the filing apparatus 1 may calculate the position deviation signal Pa (FIG. 4B) by using PosA, PosB, PosC, PosD and supply it to the developing device 2. In this case, it is necessary that only one item of data is sent to the first RAM 65 of the connecting device 3 in place of the four items of data.

(i-2) Second modification

In order to determine a current value by servo calculation by the firmware of the developing device 2, it is necessary to know the servo constants in the machine in advance. It is therefore necessary to change the servo constants when a different filing apparatus is used. Consequently, it is necessary to know what type of filing apparatus is currently connected to the developing device 2.

For this reason, the filing apparatus 1 supplies the code indicating the type of filing apparatus before transferring the position information, for example, at the step 203 in FIG. 16. Codes are determined for example, as follows:

| code 001 | 2.5 inch | type A |
| code 002 | 2.5 inch | type B |
| code 003 | 3.5 inch | type A |
| ... | | | so as to enable the type of filing apparatus to be identified by a code. The filing apparatus 1 supplies the code to the developing device 2. Since the data shown in FIG. 11 are stored in the second ROM 62 of the developing device 2, the developing device 2 reads servo constants, track width, acceleration constant, maximum current value, . . . in correspondence with the file code, and executes servo calculation by using these constants. In this manner, it is possible to develop a novel MCU which corresponds to a filing apparatus, and it is also possible to examine a different response by varying the servo constants.

Although the type of filing apparatus is supplied in this modification, servo constants, acceleration constant, etc., may be directly supplied to the developing device 2. Furthermore, there is a method of transferring data for indicating a machine control block. For example, if it is assumed that the transfer function of the voice coil motor VCM is represented by the following formula:

$$BL/m(s^2+2\zeta\omega s+\omega^2),$$

the filing apparatus 1 transfers the coefficient of each term of the denominator and the numerator to the developing device 2. When the MCU of the developing device 2 receives these constants, it calculates the control constants by utilizing these constants at the step 302$b$ in FIG. 18. For example, the value of BL/m is set to 1.0 at the time of design, and when the filing apparatus is actually operated, the value of BL/m received is multiplied (or divided) so as to calculate the current value.

(i-3) Third modification

An in-circuit emulator may be utilized in place of mounting the MCU itself on the developing device 2. In this case, a breakpoint for debugging is provided.

Information is supplied and received to and from the filing apparatus 1 and the developing device 2 via the first and second RAMs of the connecting device 3 in the embodiment. Alternatively, a serial port such as RSC232c may be utilized.

(i-4) Fourth modification

In the first to third modifications, the developing system for a filing apparatus constitutes the existent filing apparatus 1, the developing device 2 and the connecting device 3. Alternatively, it is possible to develop a firmware by connecting a computer system such as personal computer and a work station to the developing device 2. In this case, the display unit 64 of the developing device 2 is dispensed with.

Figure 21:
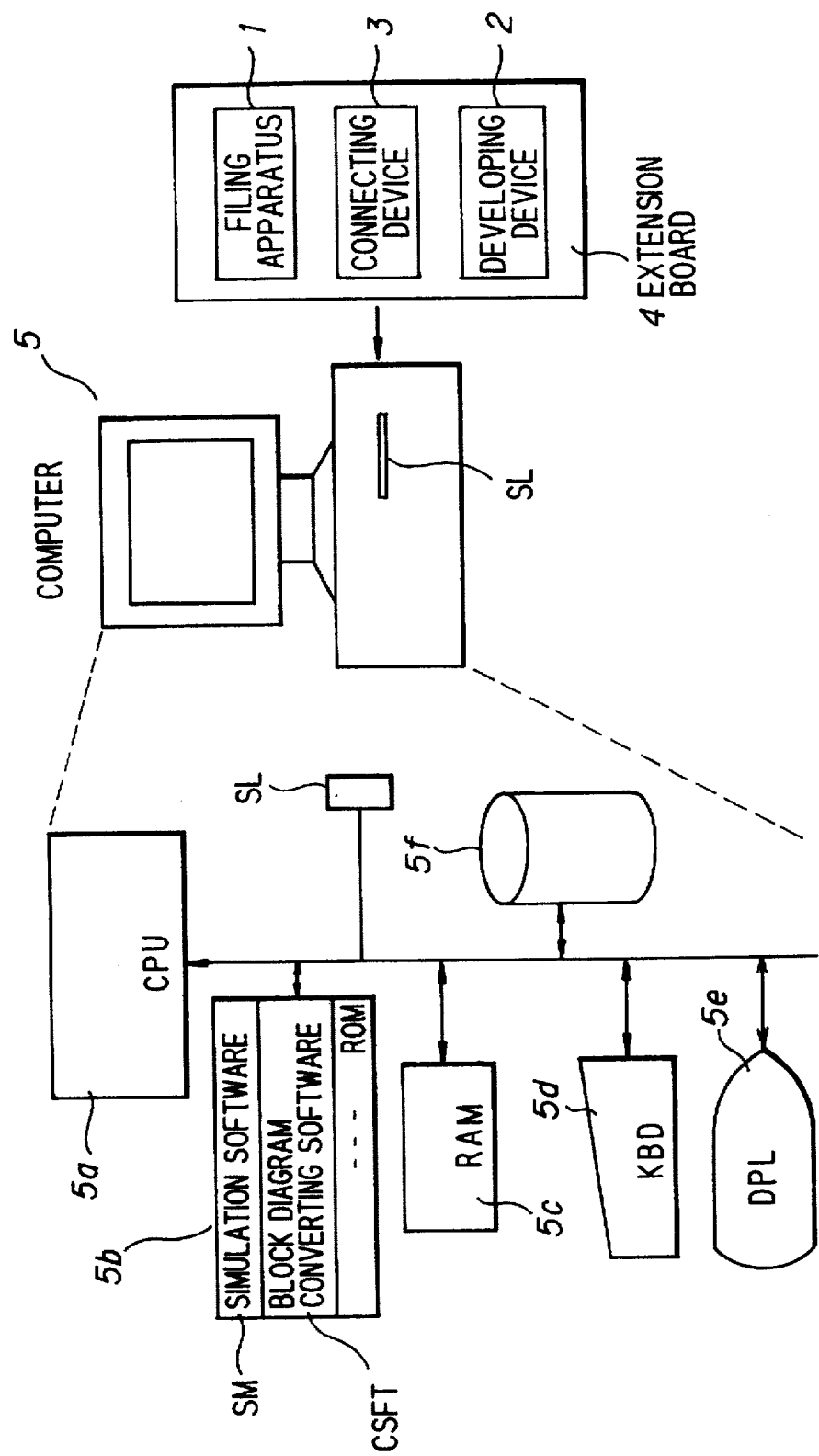
FIG. 21 shows the structure of a developing system for a filing apparatus to which a computer is connected.

FIG. 21 shows the structure of a developing system for a filing apparatus to which a computer is connected. In FIG. 21, the reference numeral 4 represents an extension board on which the filing apparatus 1, the developing device 2 and the connecting device 3 are mounted, and 5 a computer. A slot SL for the extension board 4 is provided in the computer 5, and when the extension board 4 is inserted into the slot SL, the developing device 2 and the computer 5 are connected to each other through a bus. In the computer 5, the reference numeral 5$a$ denotes a CPU, 5$b$ a ROM in which various programs are stored, 5$c$ a RAM, 5$d$ a keyboard, 5$e$ a display unit, and 5$h$ a hard disk. The symbol SL denotes a slot for the extension board 4.

In this developing system, the firmware of a control system (MCU) is developed in the computer 5. The code of the firmware is transferred to the bus of the MCU 61 of the developing device 2. Thereafter, the MCU 61 of the developing device 2 is operated so as to calculate a current value in accordance with the flow shown in FIGS. 18 and 19.

In this case, the developing device 2 supplies the position information and the current value information, and the computer 5 displays the position and the speed of the head on the display screen on the basis of the information. In this manner, it is possible to judge the state of the developed firmware and detect a portion having a problem, thereby facilitating amelioration or the like.

In addition, it is possible to examine the difference in response by using a plurality of extension boards.

It is also possible to use simulation software SM for the computer 5. The structure of the servo control system is input to the computer 5 in the form of a block diagram. The computer 5 executes simulation by using the block diagram in the basis of the simulation software SM. The position information supplied from the developing device 2, the actual speed and the current value obtained on the basis of the position information are displayed by the display unit 5$e$, and the computer 5 compares the displayed data with the results of the simulation. In this manner, the development of the firmware of an MCU is facilitated by using a computer.

If converting software CSFT which is capable of converting a block diagram into firmware is prepared, it is possible to convert the portions of a block diagram which are related to the control of an MCU into a program and execute the program. As a tool for converting a block diagram into a program, SIMULINK, (a trade name), produced by The MathWorks Inc., U.S.A. is usable. This software enables the structure of a control system to be input in the form of a block diagram and the block diagram to be converted into C language. It is therefore possible to obtain the program (firmware) of the MCU of the developing device 2 by converting the C language into a code which is usable by the MCU of the developing device 2 by the computer 5. In this manner, the development of the firmware is even more facilitated.

(i-5) Fifth modification

Figure 22:
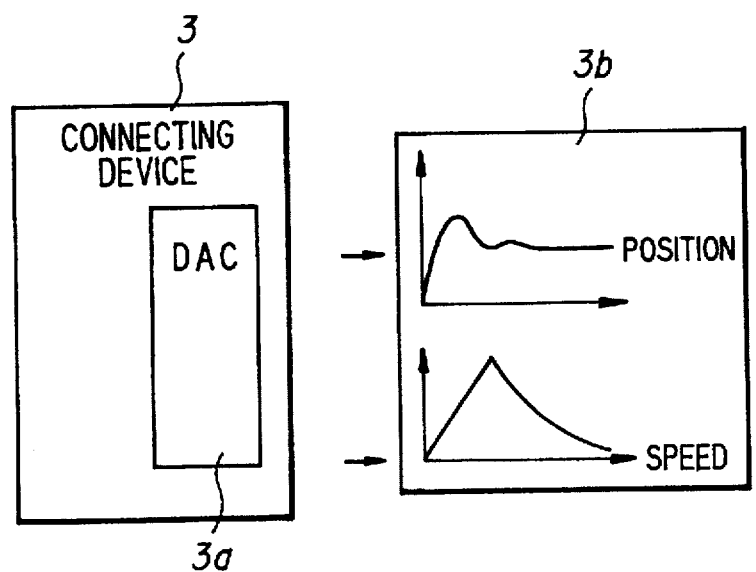
FIG. 22 is an explanatory view of a connecting device provided with a DA converter.

It is possible to remove the displaying function from the developing device 2 and to provide a DA converter and a display unit for confirming the operation of a servo control system in the connecting device 3 instead. As shown in FIG. 22, a DA converter for converting digital position information into analog information is provided in the connecting device 3 and the head position and the head speed are displayed on the basis of the output of the DA converter. According to this structure, since it is possible to observe the state in which the head is controlled by the firmware, the development of firmware is facilitated.

(C) Measuring system of filing apparatus (a) Structure of a measuring system

Figure 23:
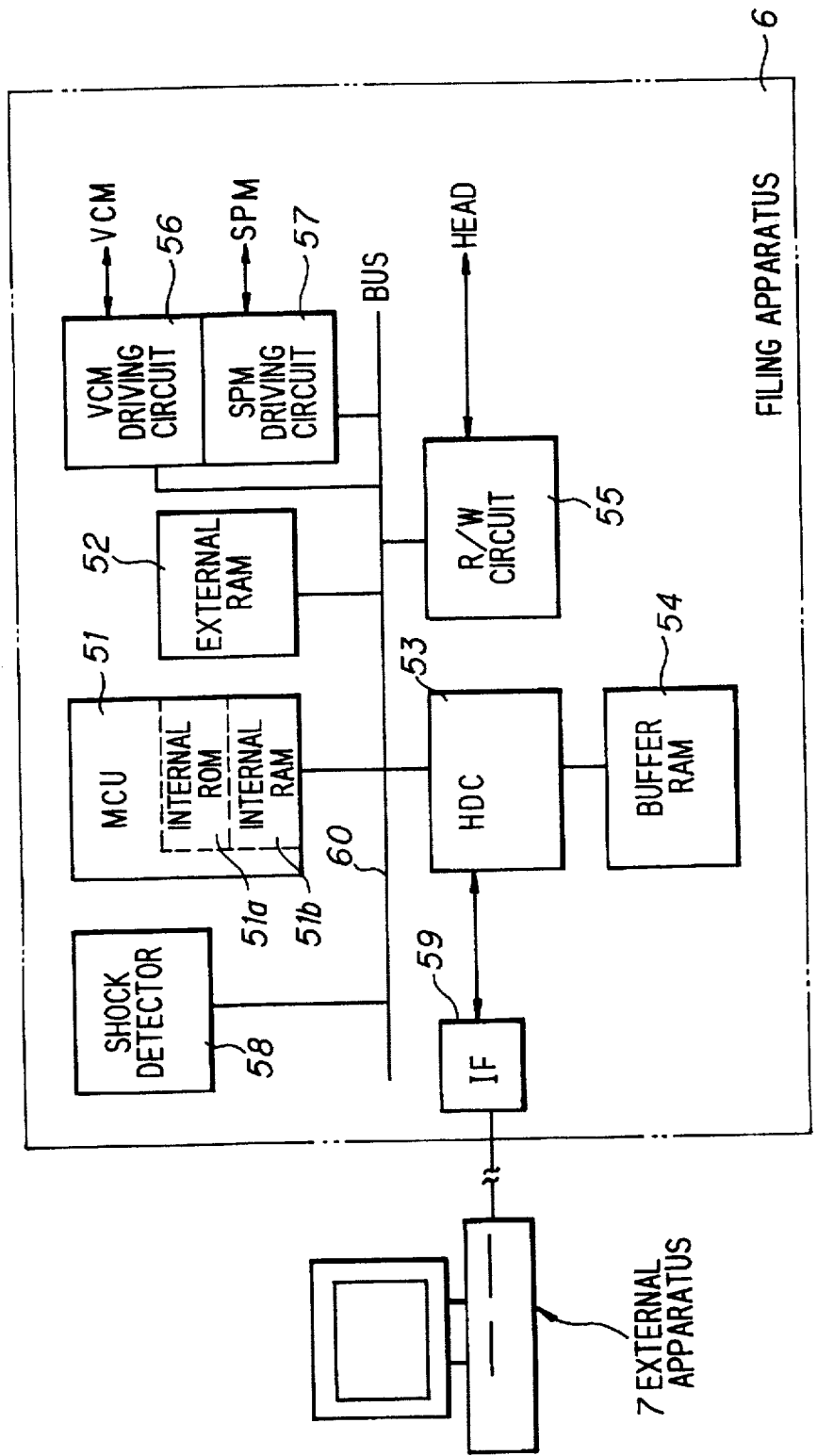
FIG. 23 shows the structure of a measuring system according to the present invention.

FIG. 23 shows the structure of a measuring system according to the present invention. In FIG. 23, the reference numeral 6 represents a filing apparatus, 7 an external apparatus such as a personal computer.

The filing apparatus 6 has approximately the same hardware structure as the existent filing apparatus 1 shown in FIG. 9. Only the difference is that there is no bus to the connecting device 3 (FIG. 8). The reference numeral 51 represents a microcontroller unit (MCU) accommodating a ROM 51a and a RAM 51b. The ROM 51a in the MCU 51 stores various programs including firmware for servo control and firmware for measuring the mechanical operation. The reference numeral 52 represents an external RAM, 53 a hard disk controller HDC, 54 a buffer RAM for the HDC, 55 a read/write circuit, 56 a VCM driving circuit, 57 an SPM driving circuit, 58 a shock detector, 59 an interface portion between the filing apparatus 6 and the personal computer as the external apparatus 7, and 60 a bus.

Since the machine parts such as a voice coil motor VCM and the spindle motor SPM are controlled by MCU 51, all of the mechanical operation is controlled as numeric information. The information for several samplings which is necessary for control is stored in a predetermined storage area (mechanical operation information storage area) of the internal RAM 51b.

The RAM 51b, the external RAM 52 and the buffer RAM 54 for the HDC in the filing apparatus 6 are utilized as an area for storing the information about the mechanical operation for the recent N samplings as the measured data. The MCU 51 selects the usable area from these memories and stores the information about the mechanical operation as the measured data in time series. When the external apparatus 7 requests the MCU 51 to supply the results of measurement via the interface, the MCU 51 supplies the measured values stored in the area in time series. In a conventional measuring system, since the period during which measured data are stored is extremely short, and stored information is partial, it is impossible to take out desired information.

(b) Information stored in the internal RAM

Figure 24:
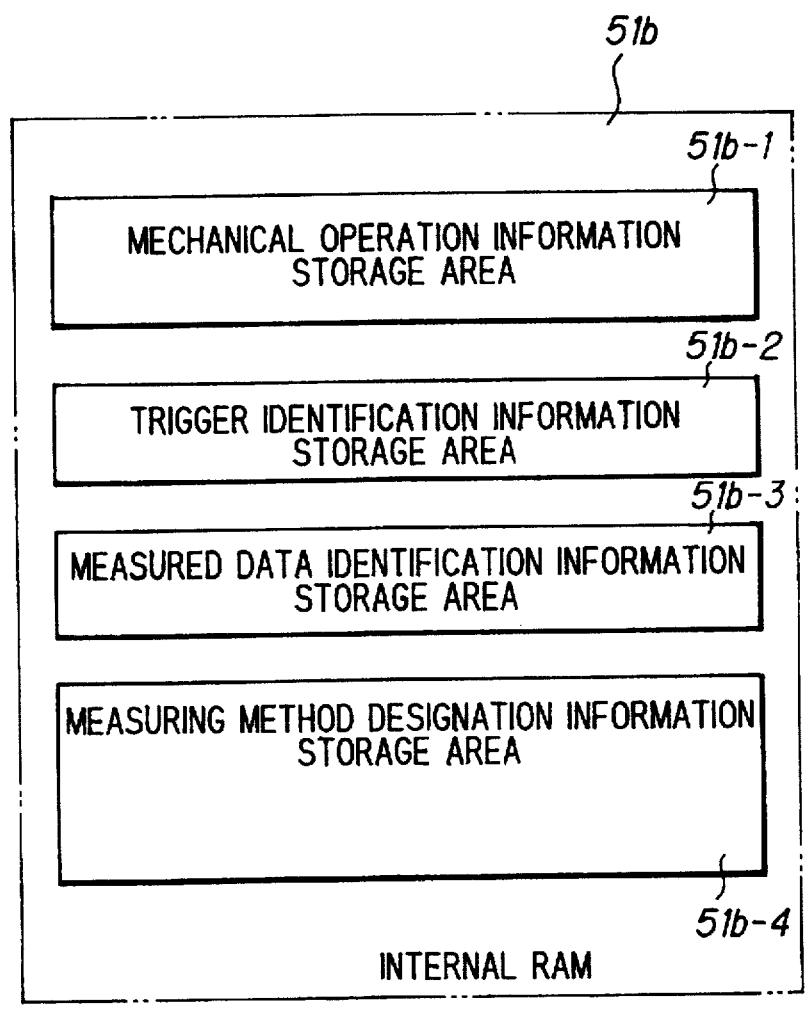
FIG. 24 is an explanatory view of the information stored in an internal RAM.

The internal RAM 51b has: (1) a mechanical operation information storage area 51b-1 for storing information indicating the mechanical operations of the VCM, the SPM, etc.; (2) a trigger identification information storage area 51b-2; (3) a measured data identification information storage area 51b-3; (4) a measuring method designation information storage area 51b-4, and other areas, as shown in FIG. 24.

The mechanical operation information is information about the mechanical operations of the voice coil motor VCM, the spindle motor SPM, etc. which includes: (1) the position of the VCM (head position); (2) the actual speed of the VCM, (3) the target speed of the VCM, (4) the current value of the VCM, (5) the RAM address indicating the current operation of the VCM processing; (6) the number of revolutions of the SPM, etc., as shown in FIG. 25. The mechanical operation information for the number of samplings which are necessary for servo control is stored in the mechanical operation information storage area 51b-1.

The trigger identification information indicates the correspondence of the trigger for starting the measurement of mechanical operation and the identification number in a trigger wait mode. FIG. 26 is an explanatory view of the trigger identification information. The identification number 00 represents free-run (constant measurement), 01 power-ON, 03 start of SPM rotation, 03 on-track, 04 start of seeking, 05 end of seeking, 06 detection of a shock and 07 start of calibration. In the trigger wait mode, a plurality of triggers are set so that when one of the triggers emerges, measurement is started.

The measured data identification information indicates the correspondence between a measured data identification number, the address at the internal RAM at which measured data (mechanical operation information) is stored, and the size of the measured data. As the measured data, there are: (1) the position of the VCM (head position); (2) the actual speed of the VCM; (3) the target speed of the VCM; (4) the current value of the VCM; (5) the RAM address indicating the current operation of the VCM processing; (6) the number of revolutions of the SPM and (7) the data stored at any give RAM address, as shown in FIG. 27.

The measuring method designation information is information for designating the method of measurement which includes: (1) interval of measurement; (2) measuring time; (3) measuring time before the detection of a trigger; (4) measurement mode; (5) trigger for starting measurement; (6) type of data measured, etc., as shown in FIG. 28. The measuring method designation information is designated by the external apparatus 7 via the interface and is stored in the measuring method designation information storage area 51b-4 of the internal RAM 51b.

(c) External RAM

Figure 29:
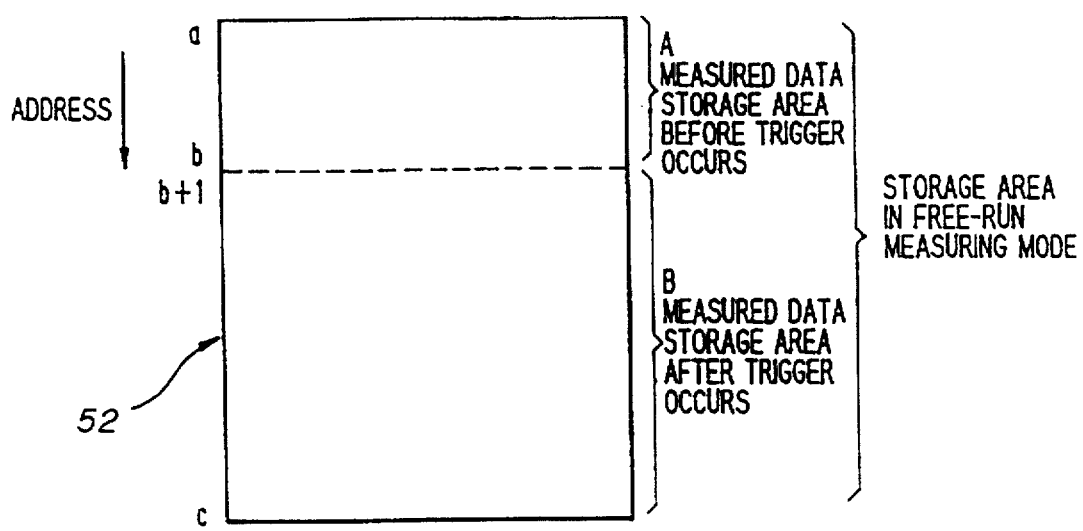
FIG. 29 is an explanatory view of a measured data storage area.

Measured data can be stored in any of the internal RAM 51b, the external RAM 52 and the buffer RAM 54, as described above. If it is assumed that the measured data are stored in the external RAM 52, the addresses a to c in the external RAM 52 are set to be measured data storage area, as shown in FIG. 29.

In the free-run mode, the measured data designated in accordance with the measuring method designation information are sequentially stored at the addresses a to c beginning with the address a in time series at every sampling period (servo interruption period). When data is stored at the address c, the next data is again overwritten at the address a. In other words, the measured data for the latest N samplings are constantly stored in the external RAM 52. At the time of reading measured data from the external RAM 52 and transferring it to the external apparatus 7, the oldest measured data are read in time series and transferred to the external apparatus 7.

In the trigger wait mode, the addresses a and b constitute a measured data storage area A before a trigger occurs, and the addresses (b+1) and c constitute a measured data storage area B after a trigger occurs. The size of the measured data storage area A before a trigger occurs is determined by the number of items of measured data which are designated by the measuring method designation information and the measuring time (number of samplings) before the trigger is detected. In the trigger wait mode, the measured data designated in accordance with the measuring method designation information are sequentially stored in the measured data storage area A beginning with the address a in time series for the designated measuring time, and when data is stored at the address b, the next data is again overwritten at the address a. In other words, the measured data for the latest n samplings are constantly stored in the measured data storage area A. When a trigger is detected, the measured data for the remaining number of designated samples are sequentially stored in the measured data storage area B beginning with the address (b+1). At the time of reading measured data from the external RAM 52 and transferring it to the external apparatus 7, the oldest measured data are read from the measured data storage area A, and then read from the storage area B and transferred to the external apparatus 7. In other words, the measured data is arranged in the order of time series before they are output.

(d) Operation timing and the structure of the servo program (d-1) Operation timing As the program of the MCU, there is a servo program for controlling the VCM and the there is and an interface program for controlling the supply and reception of read/write data and measured data to and from the external apparatus.

Figure 30:
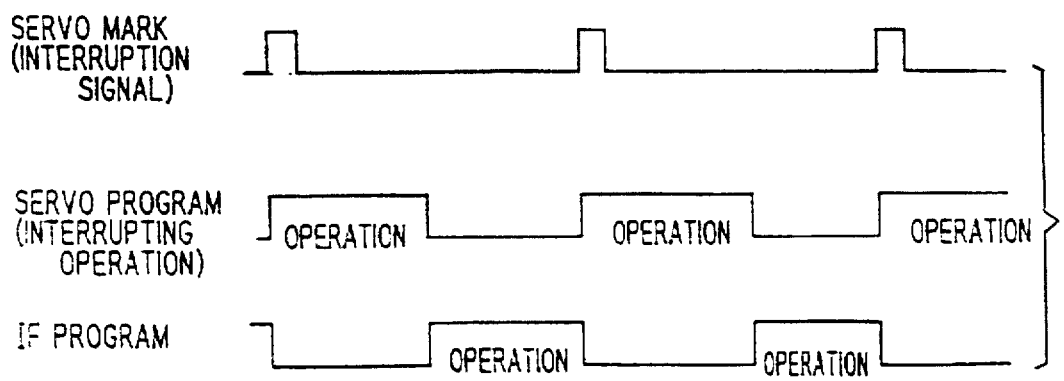
FIG. 30 is an operation timing chart.

FIG. 30 shows the servo mark and the operation timings of the servo program and the interface program.

The servo mark signal SM recorded on the disk medium surface is supplied to the MCU 51 so as to cause interruption in the MCU 51 at constant intervals of time. When an interruption occurs, the MCU 51 suspends the processing of the interface program which is operating at that point of time so as to execute the processing of the servo program. When a series of processing of the servo program is finished, the MCU 51 resumes the operation of the interface program which has been suspended.

(d-2) Structure of the servo program (1) Structure of the servo program

Figure 31:
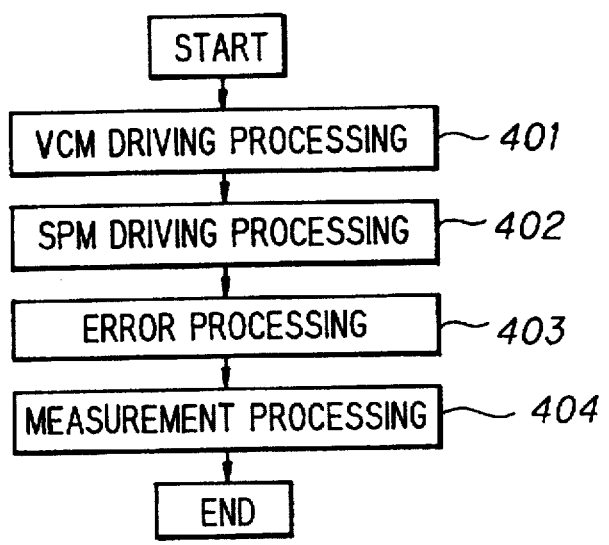
FIG. 31 is an explanatory view of the internal structure of servo interruption processing.

FIG. 31 shows the internal structure of the servo program. When the servo program is started, voice coil motor driving processing 401, spindle motor driving processing 402, error processing 403 and measurement processing 404 are serially executed in that order.

(2) VCM driving processing

Figure 32:
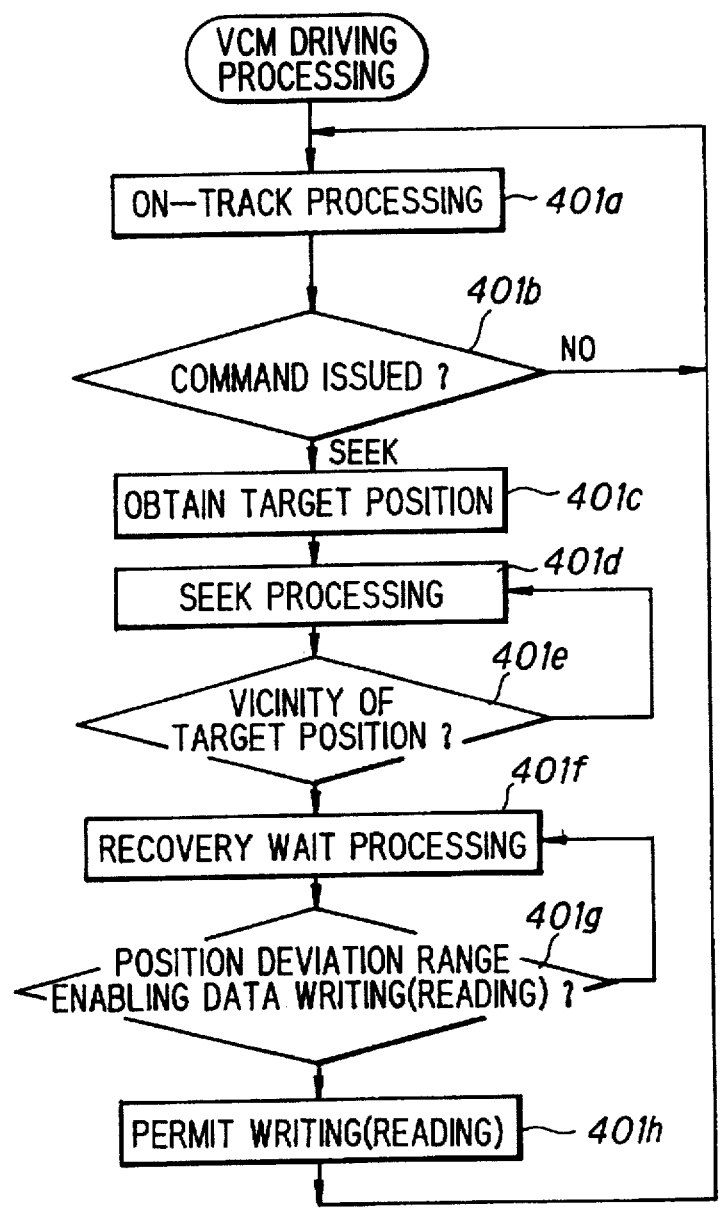
FIG. 32 is a flow chart of VCM driving processing.

The VCM driving processing is divided into track follow (tracking) control and seek control. FIG. 32 is a flow chart of the VCM driving processing.

Ordinarily, on-track (tracking) processing for positioning the head at the center of a track is executed (step 401a). Judgement is made as to whether or not a seek command is issued (step 401a) during the tracking processing, and if the answer is in the negative, the tracking processing is continued. On the other hand, if a seek command is issued, the target position is obtained (step 401c) and seek processing is started (step 401d). Seek processing is processing for generating the designated speed which corresponds to the number of tracks between the track at which the head is currently situated and the target track, calculating the designated current value which corresponds to the difference between the designated speed and the actual speed and inputting the designated current speed to the VCM driving circuit 56.

Whether or not the head has reached the target track by the rotation of the voice coil motor VCM is judged (401e), and if the answer is in the negative, the seek processing is continued. If the head reaches the vicinity of the target position, for example, onto the target track, position control processing for so controlling the head position that the deviation of the head position from the center of the track is zero (step 401f) is executed. Judgement is then made as to whether or not the head approaches the center of the track near enough to enable data writing or data reading (step 401g), and if the answer is NO, the position control processing is continued. If the head enters the position deviation range which enables data writing or data reading, data writing or data reading is permitted (step 401h), and the process returns to the start, thereby executing tracking processing.

(3) SPM driving processing

Figure 33:
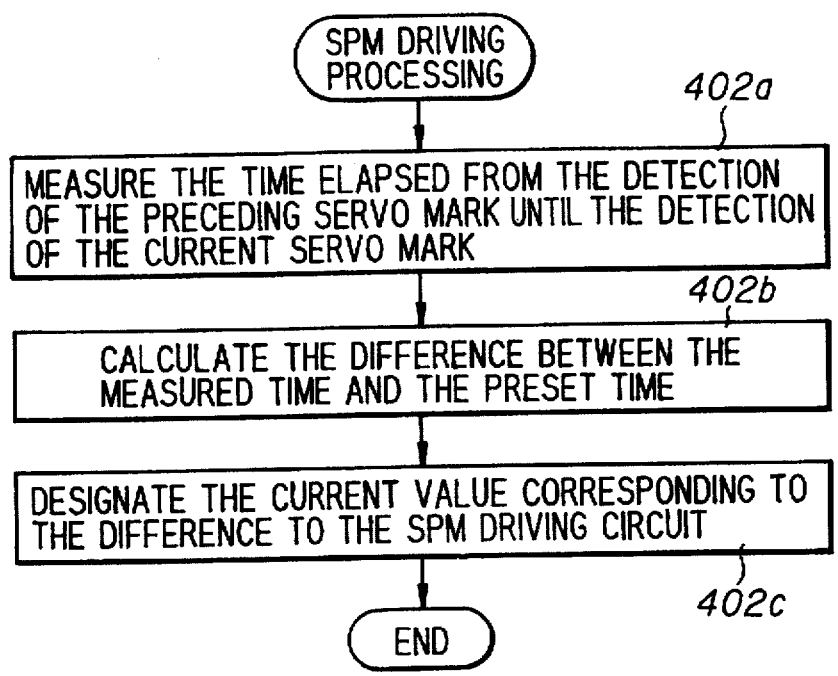
FIG. 33 is a flow chart of SPM driving processing.

FIG. 33 is a flow chart of the SPM driving processing.

The time elapsed from the detection of the preceding servo mark until the detection of the current servo mark is measured (step 402a), and the difference between the measured time and the set time is calculated (step 402b). The set time is the time it takes the head to move from one sector to the adjacent sector when a disk is controlled at a constant peripheral speed. Then the spindle motor driving current value is calculated so that the difference becomes zero, and the current value is supplied to the SPM driving circuit (step 402c). The process then returns to the start and the same processing is repeated.

(4) Measurement processing

When measurement is not necessary, no measurement processing is executed, but when it is necessary, measurement processing is executed in parallel with VCM control processing and the SPM control processing. In other words, measurement processing is executed in parallel with other control processing, and the results of measurement are stored in the storage area of the external RAM 52 which is secured in advance. The measured values are read from the storage area and transferred to the external apparatus via the interface, as occasion demands, whereby the external apparatus grasps the mechanical operation state.

(d-3) Measurement processing (1) Internal structure of measurement processing

Figure 34:
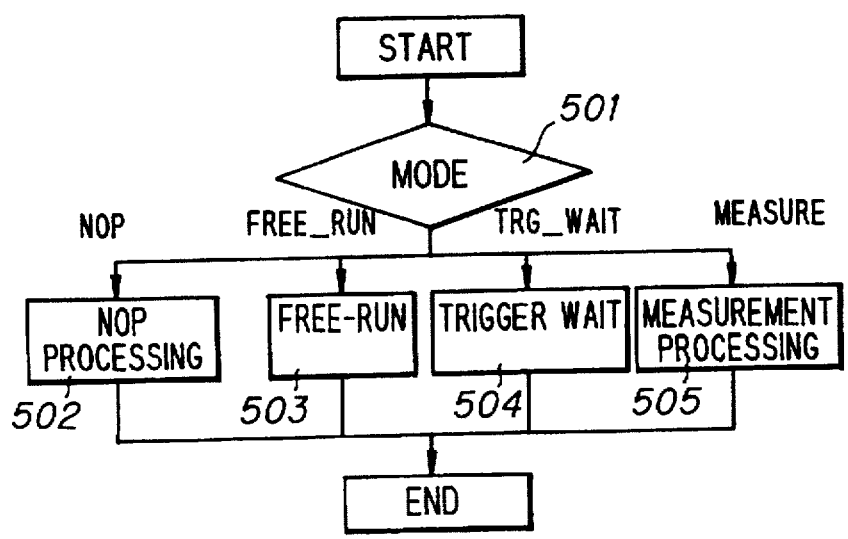
FIG. 34 is an explanatory view of the internal structure of measurement processing.

FIG. 34 shows the internal structure of measurement processing. The measurement mode designated by the external apparatus 7 is identified (step 501), and NOP (no operation) processing (step 502), free-run processing (step 503), trigger wait processing (step 504) and measurement processing (505) are executed in accordance with the mode.

In the NOP mode, no measurement is actually executed. In the free-run mode, data is constantly measured. In the free-run mode, measured data are stored in the preset storage area (see FIG. 29), and if data overflows the storage area, the address of the storage area is returned to the starting address, and the data is overwritten there, thereby constantly holding the latest measured data. In the trigger wait mode, issue of the designated trigger is waited for. In the trigger wait mode, it is possible to designate the measuring time before the issue of the trigger, measure the mechanical operation information for the measuring time and store the measured mechanical operation in the storage area. In the measurement mode, the mechanical operation information is measured after a trigger is detected until the number of items of measured data reaches a designated number, and it is stored in the storage area as measured data.

(2) Processing in the free-run mode

Figure 35:
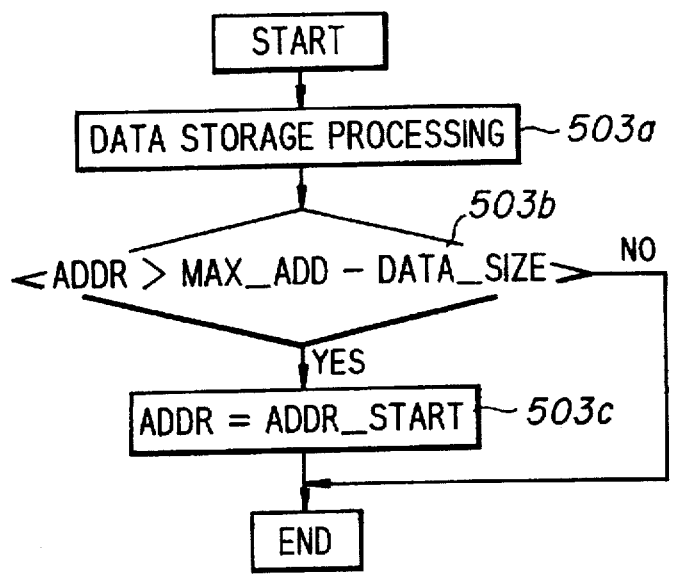
FIG. 35 is a flow chart of processing in the free-run mode.

FIG. 35 is a flow chart of processing in the free-run mode.

In the free-run mode, the mechanical operation designated by the external apparatus is constantly stored in the storage area (see FIG. 29) of the external RAM 52 as measured data at every sampling period (servo interruption period) irrespective of a trigger (step 503a).

After data is stored, whether the measured data which is to be stored at the next measuring time overflows the storage area is judged. That is, the value obtained by subtracting the size DATA-SIZE of the measured data for one sampling from the maximum address MAX-ADD of the storage area is compared with the address ADDR at which the next measured data is written (step 503b).

If ADDR≦MAX-ADDR−DATA-SIZE, in other words, if the remaining area is larger than the data size, processing is terminated. However, if ADDR>MAX-ADDR−DATA-SIZE, in other words, if the data size is so large as to exceed the range of the remaining storage area, the address ADDR at which the next measured data is written is set to be the head address ADD-START of the storage area (step 503c), and process is terminated. As a result, the data is overwritten on the data written at the ADD-START at the previous time, which is thereby erased. In this manner, the latest measured values are constantly stored to the capacity of the storage area.

The free-run mode is terminated when a measurement end command is supplied from the external apparatus 7 via the interface or when measured values start to be supplied to the external apparatus 7 via the interface. When the free-run mode is terminated, the NOP processing is started.

(3) Processing in the measurement mode

Figure 36:
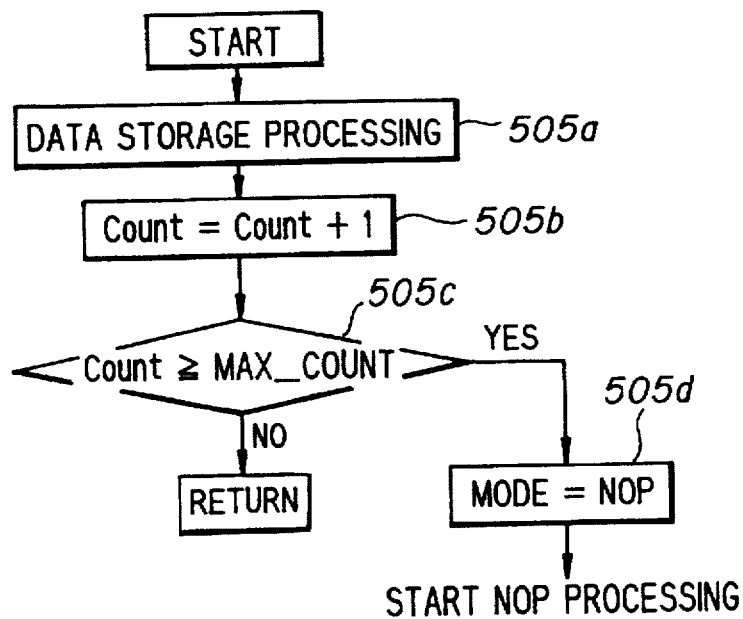
FIG. 36 is a flow chart of processing in the measurement mode.

FIG. 36 is a flow chart of measurement processing.

When a trigger for starting measurement is issued, the mechanical operation information designated by the external apparatus 7 is stored in the storage area of the external apparatus 52 as measured data at every sampling period (servo interruption period) (step 505a). Every time measured data is stored, 1 is added to the count (Count+1= Count) (step 505b), and judgement is made as to whether or not the count is the number MAX-Count which corresponds to the designated measuring time (step 505c). If Count≧MAX-Count, the mode is changed to the NOP mode (step 505d) and the NOP processing is started. On the other hand, if Count<MAX-Count, the above processing is repeated at every interruption.

In other words, at every measurement step, the measured value is copied to the storage area. When the count reaches the designated value, the measurement is terminated, and the NOP process is started.

(4) Processing in the trigger wait mode

Figure 37:
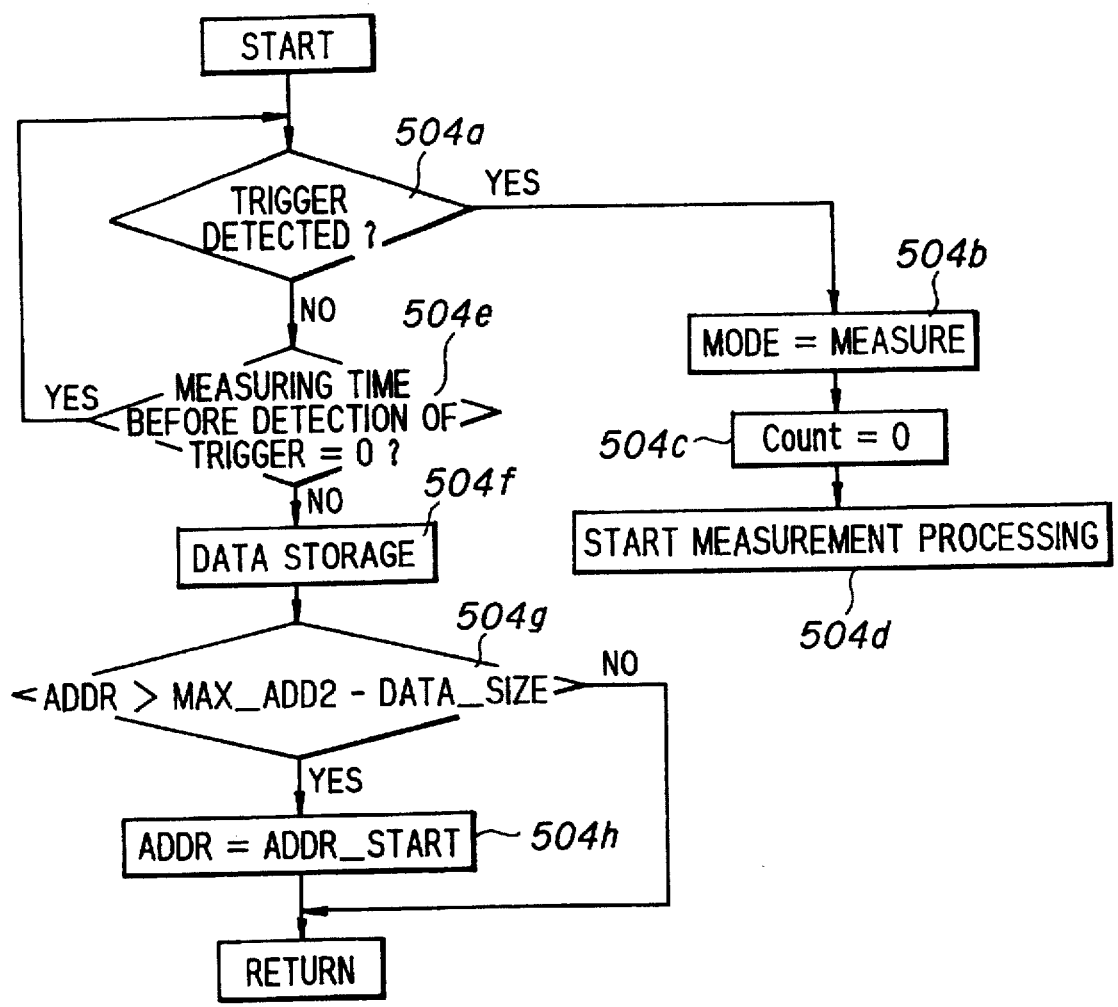
FIG. 37 is a flow chart of processing in the trigger wait mode.

FIG. 37 is a flow chart in the trigger wait mode. In the trigger wait mode, judgement is made as to whether or not the designated trigger for staring measurement is detected (step 504a), and if the answer is YES, the mode is changed to the trigger wait mode (step 504b), and the count is set to 0 (step 504c). Thereafter, measurement processing in FIG. 36 is started.

On the other hand, if the trigger for starting measurement is not detected, judgement is made as to whether or not the "measuring time T before a trigger is issued" designated by the external apparatus is 0 (step 504e). If T=0, the process returns to the step 504a and the detection of a trigger is waited for. On the other hand, if T is not zero, the mechanical operation designated by the external apparatus is stored in the storage area A of the external RAM 52 (FIG. 29) as measured data at every sampling period (servo interruption period). The size of the storage area A is determined by the measuring time T and the number of pieces of mechanical operation information (data size) to be measured.

After storing data, judgement is made as to whether or not the measured data to be stored at the next measurement exceeds the range of the storage area A. That is, the value obtained by subtracting the size DATA-SIZE of the measured data for one sampling from the maximum address MAX-ADD of the storage area is compared with the address ADDR at which the next measured data is written (step 504g).

If ADDR≦MAX-ADDR−DATA-SIZE, in other words, if the remaining area is larger than the data size, processing is terminated, and the above processing is repeated at the next interruption. However, if ADDR>MAX-ADDR−DATA-SIZE, in other words, if the data size is so large as to exceed the range of the remaining storage area, the address ADDR at which the next measured data is written is set to be the head address ADD-START of the storage area A (step 504h), and process is terminated. As a result, the data is overwritten on the data written at the ADD-START at the previous time and is erased. In this manner, the latest measured values are constantly stored to the capacity of the storage area.

(e) Common measurement processing (e-1) Setting of the measuring method designation information Prior to measurement, the external apparatus 7 designates the measuring method designation information shown in FIG. 28, namely, interval of measurement (sampling)

measuring time measuring time before the detection of a trigger measurement mode trigger for starting measurement type of data measured to the filing apparatus 6 via the interface, and the MCU 51 stores the measuring method designation information in the storage area 51b-4 of the internal RAM 51b.

The "interval of measurement" designates the number of samplings after which the mechanical operation information is constantly fetched as measured data. The "trigger for starting measurement" is a trigger for starting measurement in the trigger wait mode. A number is allotted to a trigger, as follows, in advance, and it is possible to designate a plurality of triggers at the time of measurement.

| Number | Source |
|--------|--------|
| 00 | Free-run |
| 01 | Power ON |
| 02 | Start SPM rotation |
| 03 | On-track |
| 04 | Start of seeking |
| 05 | End of seeking |
| 06 | Detection of a shock |
| 07 | Start of calibration |

The MCU 51 is prepared to start the measurement processing when the trigger designated by the measuring method designation information is issued. That is, the information indicating an issue of a trigger is supplied to the program of the measurement processing. The MCU 51 judges whether or not the trigger designated by the measuring method designation information is issued in accordance with the measurement processing program, and if the answer is YES, measurement is started.

The method of supplying the information indicating an issue of a trigger is, for example, a method of using a specific memory as a flag of a specific bit. Bits are allotted to sources. For example, the 0-th bit is allotted to power-ON, and the fourth bit is allotted to the start of seeking. If the flag is "1", the operation is active, and the flag is "0", the operation is negative. In this manner, it is possible to judge the measurement starting timing by the measurement program merely by monitoring the bit which corresponds to the trigger as the object.

Alternatively, the triggers may be designated by numeric values. For example, 1 is allotted to power-ON, 7 is allotted to start of seeking, . . . , and the numerals are set in the memory for transferring information when a trigger is issued. The measurement program constantly monitors whether or not the memory for transferring information reaches a specific value (value which corresponds to the trigger designated by the measuring method designation information), thereby detecting the issue of the trigger. In addition, a method of changing the mode to the measurement processing mode when a trigger for starting measurement is issued may be adopted.

The "type of data measured" designates the mechanical operation information to be stored as measured data. All the information about mechanical operation is stored in the storage area 51b-1 of the internal RAM 51b. Therefore, such a table as shown in the following is prepared in advance and stored in the storage area 51b-1 of the internal RAM 51b. This table means, for example, that the data of identification number 00 represents the position of the VCM, and the address in the internal RAM at which the data is stored is XXXXH, and the data size is 2 bytes.

| No. | Address | Size | Measured data |
|---|---|---|---|
| 00 | XXXXH | 2 | Position of VCM |
| 01 | XXXXH | 2 | Speed of VCM |
| 02 | XXXXH | 2 | Target speed of VCM |
| 03 | XXXXH | 2 | Current value of VCM |
| 04 | XXXXH | 2 | RAM address indicating the current VCM processing |
| 05 | XXXXH | 2 | Number of rotation of SPM |
| 06 | XXXXH | X | Any given address |

If such a table is stored in the internal RAM 51b, the MCU 51 can measure the designated mechanical operation accurately and store it when the number of the data to be measured is designated by the "type of data measured".

For example, the data to be measured are designated by using the identification numbers in the above table as 0, 1, and 3. The MCU 51 holds "0, 1, 3", and measures the position, speed and current value of the VCM at the time of measurement and stores the measured values in the storage area of the external RAM 52. If the address and the size can be designated as occasion demands like the last number 06 in the table, it is possible to freely select the type of data. In this case, it is necessary to know in advance at which memory address necessary data is stored.

(e-2) Common measurement processing for fetching measured values

Figure 38:
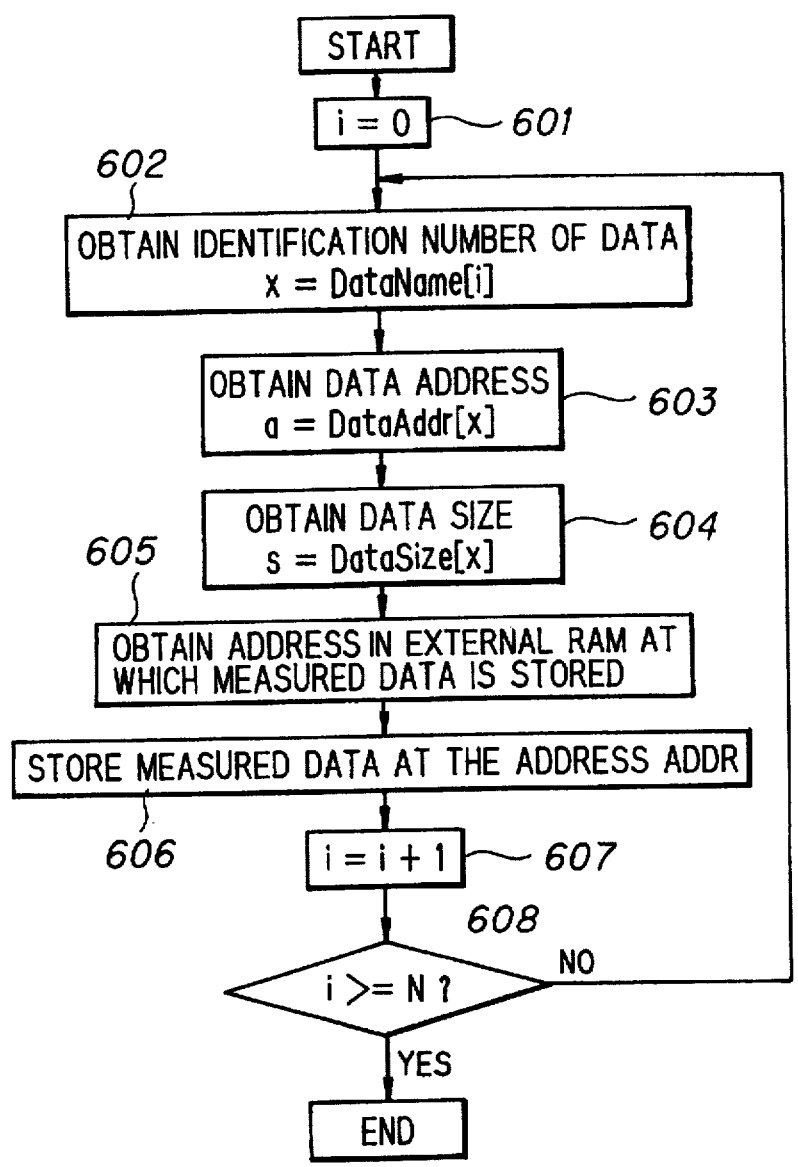
FIG. 38 is a flow chart of common measurement processing.

FIG. 38 shows common measurement processing for fetching measured values. This processing is utilized in common in the free-run mode, the trigger wait mode and the measurement mode.

At first, "i" is set to "0" (step 601), the designated "type of data measured" is read, and the number N of pieces of mechanical operation information and the identification number of the data to be measured are obtained (step 602). Thereafter, the data address a in the internal RAM 51b at which the data of the identification number is stored and the data size s are obtained by referring to the table (FIG. 27) (steps 603, 604).

When the data address a and the data size s are obtained, the address ADDR in the external RAM 52 at which the measured data is stored is obtained (step 605, see the step 503b in FIG. 35 and the step 504g in FIG. 37).

When the address ADDR is obtained, the mechanical operation information is read from the address in the internal RAM 51b, and stored at the address ADDR in the external RAM 52 as the measured data (step 606).

When the storage of the data is ended, 1 is added to "i" (step 607), and judgement is made as to whether or not i≧N (step 608). If i<N, the process returns to the step 602, the same processing is repeated with respect to the next identification number. When i≧N, the measured data storage process for 1 sampling is ended.

As the measured data storage area, the internal RAM 51b of the MCU 51, the external RAM 52 and the buffer RAM 54 connected to the HDC are usable, but all of these are not always provided. In some cases, there is no external RAM. It is therefore convenient not to designate a specific RAM as a measured value storage region but to automatically search for an area which the MCU can use and to store measured data in this area. Since these RAM areas are disposed at specific addresses at the time of designing a circuit, it is possible to judge whether or not a RAM actually exists by writing several different numeric values at these addresses and thereafter reading the same addresses so as to judge whether or not the numeric values are read correctly. The order of priority of the RAMS used as the measured data storage area is set to be, for example, (1) the external RAM, (2) the buffer RAM and (3) the internal RAM, and if the external RAM 52 exists, the external RAM 52 is used as the measured data storage area. If the external RAM does not exist, the buffer RAM 54 is used as the measured data storage area. If neither the external RAM nor the buffer RAM 54 exists, the internal RAM 52b is used as the measured data storage area.

(f) Measured data output processing

When the measured data are stored in the storage area in the above-described manner, measured data are appropriately read from the storage area in accordance with the demand from the external apparatus 7 and are transferred to the external apparatus 7 via the interface. In this case, the measured values stored in the storage area are arranged in time series before being transferred.

(g) Use of measured values in the external apparatus (g-1) First application

The external apparatus 7 stores the transferred measured data in the memory and displays the numeral values on the display unit as they are or in the form of a graph. Graphic display of the measured data facilitates the grasp of the mechanical operation.

(g-2) Second application

It is further possible that the external apparatus 7 evaluates the operation of the filing apparatus 6 by using the measured data and adjusts the control constants of the servo and the like so that the operation is optimum. The control constants have already been explained with reference to FIGS. 6 and 7.

It is necessary to determine all the variables in the formulas in the compensator 32 shown in FIGS. 6 and 7 at the time of design. Furthermore, various values such as the target speed and the maximum speed must be determined. These values are determined with due consideration of a certain degree of difference between the values of a designed machine and the values of the actually produced machine. However, the difference sometimes exceeds the standard tolerance. In such a case, it is necessary to change the constants in the control system.

In order to change the control constants, analysis of the current operation is first necessary. The current operation is analyzed, for example, in the following manner.

(1) Analysis of the position signal at the time of position control by FFT

The frequency component of a position signal is first examined so as to estimate the mechanical resonance and the eccentricity. If the eccentric component is large, the servo constant is adjusted so that the gain of the frequency (a multiple of the disk rotation frequency) of the eccentric component is high.

(2) Reduction of the overshoot at step response

A seek command with respect to adjacent track is issued, and the position information at a step response is measured so as to examine the fluctuations of position. If the servo constant is not optimum, the overshoot becomes large, or the recovery time it takes the head to reach the target position becomes long. When the overshoot is large, the gain is reduced so as to reduce the overshoot. When the recovery time is long, the gain is increased so as to shorten the recovery time.

(3) Correction of speed follow-up error

A seek command is issued so as to execute speed control. The target speed and the actual speed are measured so as to examine the error. If the error is large, the gain is increased so as to reduce the follow-up error.

(g-3) Third application

The above-described operations can be simulated by a computer. In a third application, a simulation function is provided for the external apparatus 7, and the result of the simulation and the measured mechanical operation are displayed on the same screen. If both displayed on the screen are compared with each other while adjusting the servo constants, the difference is made clear and the adjustment of the constants is facilitated. It is necessary to store the thus-adjusted constants so as to be utilized again by the filing apparatus 6. For this purpose, the ROM of the MCU 51 may be rewritten. Alternatively, the constants are stored on the disk medium, and after the power is ON, the servo constants stored on the medium are read and utilized in place of the constants in the ROM.

(g-4) Fourth application

Figure 39:
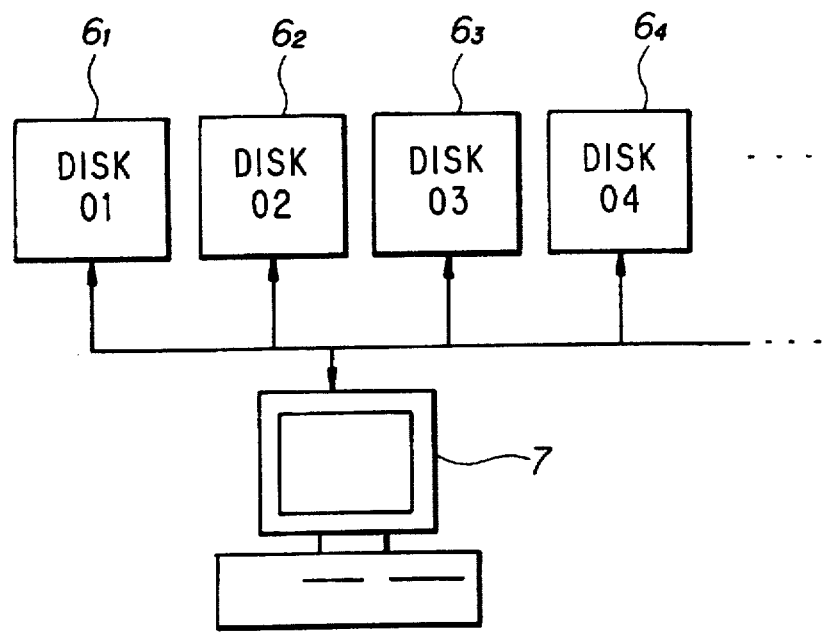
FIG. 39 shows the structure of a system for confirming an operation by using a plurality of filing apparatuses.

Measurement of the mechanical operation and adjustment of the constants can be utilized especially at the time of production in a factory. FIG. 39 shows an example thereof. At the time of test in a factory, a plurality of filing apparatuses $6_1$ to $6_4$ are connected to the computer (external apparatus) 7 for measurement, and the R/W operation, the seeking operation, etc. are measured. In this case, standard data of the mechanical operation of a filing apparatus are measured in advance. When trouble is caused in an ordinary test, data are read out and stored in order to analyze the cause in detail. The positioning accuracy and the access time are measured and stored for each filing apparatus before shipment. These values are utilized for the clarification of the cause when there is trouble.

Figure 40:
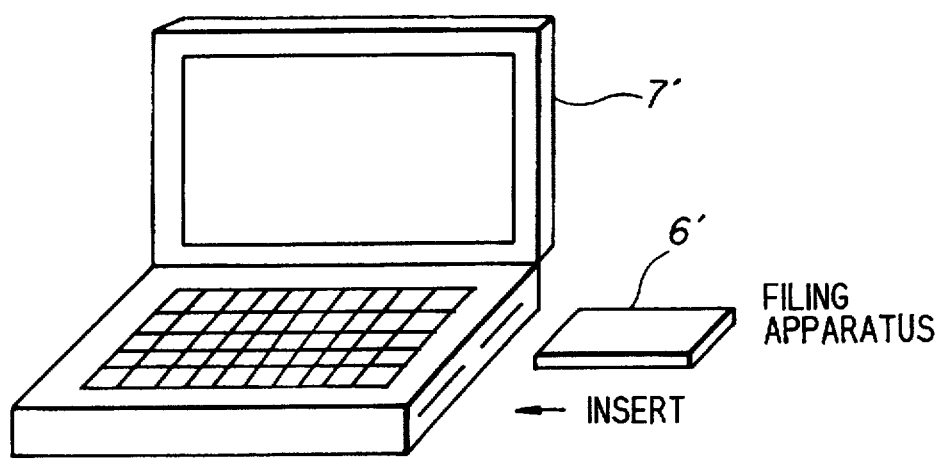
FIG. 40 is an explanatory view of an example of the use of measured values by a portable computer.

FIG. 40 is an example of a filing apparatus 6' mounted on a portable computer 7'. Even if such a small-sized computer is used, it is possible to take the data necessary for the measurement of the mechanical operation from the filing apparatus 6' without deforming the box body of the filing apparatus 6' or the box body of the computer 7'. The measured vibration caused by a shock applied to the filing apparatus when the keyboard is actually tapped is different depending upon whether or not a cable is led out of the printed circuit board. In this example, since it is not necessary to lead a cable, accurate measured data are obtained.

(g-5) Fifth application

Figure 41:
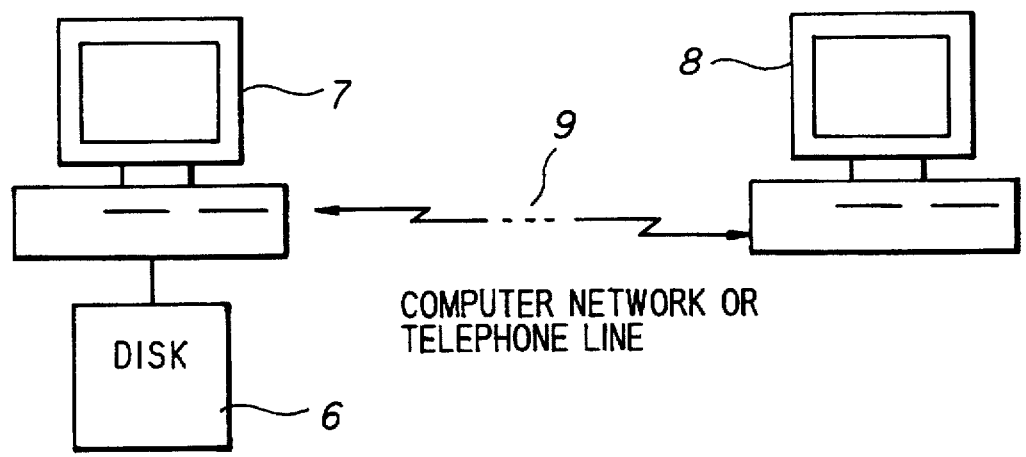
FIG. 41 shows the structure of a remote-controlled measuring system.

A filing apparatus disposed at a physically short distance from an external apparatus can be removed therefrom so as to directly measure the mechanical operation. However, if a filing apparatus is disposed at a long distance from an external apparatus, for example, if the filing apparatus is disposed in Osaka and the external apparatus is in Tokyo, it takes much time and cost to directly measure the mechanical operation. In such a case, a program for measurement is mounted on the filing apparatus in advance. The user measures the mechanical operation by using the program and stores the necessary data in the filing apparatus. The data are transmitted to the external apparatus by utilizing a network such as personal computer communication and a telephone line, so that whether or not the operation of the disk is normal is judged. FIG. 41 shows the structure of such a remote control system. In FIG. 41, the reference numeral 6 represents a filing apparatus, 7 a personal computer as an external apparatus, 8 a personal computer for measurement disposed at a remote place, and 9 a computer network.

Alternatively, a filing apparatus at a remote place may be directly operated. In this case, the program for measurement provided for the user in advance is initiated, and the computer is connected to the filing apparatus through a network. Various commands are issued from the computer to the filing apparatus at the remote place so that the computer measures the mechanical operation, thereby judging whether the operation is normal or abnormal.

A change in the resonance frequency of the machine, the flux density of the VCM, etc. with lapse of time is inevitable. It goes without saying that such a change is taken into consideration at the time of design so that stable operation is possible even when there is a change in a certain range. However, since there is an individual difference, change sometimes exceeds the tolerance. At this time, it is necessary to adjust the constants of the servo system to optimum values.

It is also possible to measure the optimum servo constants from the results of measurement of a the mechanical operation. In this case, it is necessary to correct the servo constants. If the ROM of the MCU is rewritable, the corrected servo constants are written into the ROM and the servo control calculation is executed on the basis of the servo constants. On the other hand, if the servo constants are recorded on the disk medium and read from the medium to the RAM when the power is ON, the data on the disk medium are reloaded.

Although the present invention is applied to a magnetic disk in the above explanation, it is also applicable to other apparatuses such as an optical disk.

As explained above, according to the present invention, all that is mounted on the developing device is the minimum number of circuits which are necessary for the operation of an MCU as an object of research and development, and it is possible to develop firmware of the MCU at a high speed without delay by using the existent filing apparatus.

According to the present invention, a connecting device for connecting an existent filing apparatus and a developing device is provided therebetween, and a first storage unit to which information is written by the filing apparatus and from which the information is read by the developing device and a second storage unit to which information is written by the developing device and from which the information is read by the filing apparatus are provided for the connecting device so that information is supplied and received via each storage portion. In this manner, it is possible to develop firmware of a novel MCU by combination of the existent filing apparatus, the developing apparatus and the connecting device even if the parts such as a DE and a demodulator circuit which have no relationship with the MCU are not prepared or created.

According to the present invention, a DA converter for converting digital position information into analog information is provided in the connecting device and the head position, and the head speed are displayed on the basis of the output of the DA converter. Since it is possible to observe the state in which the VCM is controlled by the firmware, the development of firmware is facilitated.

In addition, according to the present invention, since the filing apparatus supplies the servo constant corresponding to the type of filing apparatus or various servo constants in the filing apparatus to the developing device, and the developing device determines the current value of the motor on the basis of the servo constant corresponding to the type of filing apparatus or the supplied servo constants, it is possible to develop a novel MCU which corresponds to the filing apparatus, and also possible to examine a different response by varying the servo constants.

According to the present invention, a computer connected to the developing device through a bus is provided, firmware is transferred from the computer to the developing device, and the developing device determines the current value on the basis of the firmware. The developing device supplies position information and current value information to the computer, and the computer displays the head position and the speed on the screen on the basis of the information. The block diagram of the servo control system is also input to the computer, and the computer compares the result of simulation using the block diagram with the actual position information and the actual speed and current value obtained on the basis of the position information. In this manner, the firmware of an MCU by the computer is facilitated.

In addition, since the block diagram of the servo control system is input to the computer and the computer converts the block diagram into firmware and inputs it to the developing device, the development of the firmware is even more facilitated.

According to the present invention, since a measuring means measures various data in time series which indicate the operations of the mechanical parts of a filing apparatus, and stores the results of measurement in the form of numeric values, and a transferring means transfers the results of measurement to an external apparatus via an interface, it is easy to measure the mechanical operation of a filing apparatus, especially, a small-sized filing apparatus. Even if the printed circuit board is not exposed to the outside, measurement of the mechanical operation of the filing apparatus is easy.

According to the present invention, it is possible to measure data when a predetermined designated trigger among a plurality of triggers for starting measurement emerges and to store the measured values. In addition, it is possible to measure data of a predetermined designated object among a plurality of objects of measurement and to store the measured values.

Since measurement is executed even before a trigger for starting measurement emerges and the measured values for the latest designated times are stored, even if a trigger for starting measurement emerges while measured values are changing, it is possible to store the newly measured values in addition to the existent measured values and output the total measured values to the external apparatus.

Since the received measured values are stored and displayed, it is possible to judge the state of the filing apparatus and to detect a portion to be ameliorated by referring to the measured values. Since the measured values are analyzed and the control constants of the mechanical operation controlling means within the filing apparatus are determined and set on the mechanical operation controlling means, it is possible to optimally adjust the mechanical operation on the basis of the measured values. In addition, since the results of simulation of the control means for operating the actuator and the motor are displayed simultaneously with the results of measurement, it is possible to adjust the mechanical operation so as to be coincident with the result of measurement by comparing with each other.

According to the present invention, a plurality of filing apparatuses are connected to the external apparatus, and the external apparatus reads the measured values from the respective filing apparatuses when the filing apparatuses execute predetermined operations. In this manner, the external apparatus compares the measured value of each filing apparatus with a preset standard value, and when the measured value exceeds the standard value beyond a permissible range, the external apparatus can report the corresponding filing apparatus as a defective product.

Furthermore, according to the present invention, it is possible to connect a filing apparatus with an external apparatus by a communicating means such as a personal computer network and to measure the operation of the filing apparatus at a remote place. In this case, the external apparatus analyzes the measured values received via the communicating means so as to determine the control constants of the mechanical operation control means within the filing apparatus and set the control constants on the control means in the filing apparatus. It is thus possible to optimally adjust the mechanical operation of the filing apparatus on the basis of the measured values even at a remote place.

As many apparently widely different embodiments of the present invention can be made without departing from the spirit and scope thereof, it is to be understood that the invention is not limited to the specific embodiments thereof except as defined in the appended claims.

What is claimed is:

1. A developing device for a filing apparatus for developing firmware of a microcontroller unit which constitutes said filing apparatus, said filing apparatus having an information storage medium and a head for reading information from the medium, said developing device comprising:

means for supplying and receiving information about a current head position and a predetermined value of current to be supplied to a head moving motor to and from an existent filing apparatus;

a microcontroller unit accommodating firmware which determines said predetermined value of said current to be supplied to the head moving motor of said existent filing apparatus on the basis of the information about said current head position received from said existent filing apparatus; and monitoring means for monitoring the operation of said existent filing apparatus;

wherein said existent filing apparatus drives said motor on the basis of said current value determined by said firmware, said microcontroller unit determines the next current value on the basis of the information about the head position received from said existent filing apparatus at predetermined intervals of time, and said monitoring means monitors and outputs the operation of said existent filing apparatus on the basis of said information about said head position.

2. A developing device for a filing apparatus according to claim 1, wherein said developing device includes display means as said monitoring means for displaying the head position which is supplied from said existent filing apparatus at predetermined intervals of time and a head speed.

3. A developing system for a filing apparatus for developing firmware of a microcontroller unit which constitutes said filing apparatus, said filing apparatus having an information storage medium and a head for reading information from the medium, said developing system comprising:

an existent filing apparatus; and a developing device for developing firmware of a microcontroller unit which constitutes another filing apparatus which is different from the existent filing apparatus;

said developing device including:

means for supplying and receiving information about a current head position and a predetermined value of current to be supplied to a head moving motor, to and from said existent filing apparatus;

said microcontroller unit accommodating said firmware which determines said predetermined value of said current to be supplied to the head moving motor of said existent filing apparatus on the basis of the information about said current head position received from said existent filing apparatus; and monitoring means for monitoring the operation of said existent filing apparatus; and said existent filing apparatus including:

means for driving said motor on the basis of said value obtained on the basis of said position information, thereby developing said firmware.

4. A developing system for a filing apparatus according to claim 3, wherein said firmware of said microcontroller unit in said developing device determines the current value for moving said head to a desired position on the basis of said current head position and supplies said current value to said existent filing apparatus.

5. A developing system for a filing apparatus according to claim 3, further comprising a connecting device for connecting said existent filing apparatus to said developing device;

said connecting device including:

a storage portion to which information is written by said existent filing apparatus and from which said information is read by said developing device; and a storage portion to which information is written by said developing device and from which said information is read by said filing apparatus.

6. A developing system for a filing apparatus according to claim 5, wherein said connecting device further includes:

a DA converter for converting digital position information into analog information; and display means for displaying a head position and a head speed on the basis of the output of said DA converter.

7. A developing system for a filing apparatus according to claim 3, wherein said existent filing apparatus further includes means for supplying the type of said existent filing apparatus to said developing device prior to the supply of said information about said current head position;

said developing device includes storage means for storing the correspondence of said type of said existent filing apparatus with various constants of a servo system for controlling said motor; and said microcontroller unit determines said current value by using said constants of said servo system which correspond to said type of said existent filing apparatus in accordance with said firmware.

8. A developing system for a filing apparatus according to claim 3, wherein said existent filing apparatus further includes means for supplying various constants of a servo system for controlling said motor to said developing device prior to the supply of said information about said current head position; and said microcontroller unit in said developing device determines said current value by using said constants of said servo system in accordance with said firmware.

9. A developing system for a filing apparatus according to claim 3, further comprising a computer connected to said developing device through a bus, wherein said computer transfers a firmware to said developing device, and said developing device determines said current value in accordance with said firmware.

10. A developing system for a filing apparatus according to claim 9, wherein said developing device supplies said information about said head position and said current value to said computer and said computer displays the head position and a head speed on a display screen in accordance with said information.

11. A developing system for a filing apparatus according to claim 10, wherein a block diagram of a servo control system for controlling said motor is input to said computer, and said computer compares the result of simulation using said block diagram with the actual position information and the actual speed and current value obtained on the basis of said position information, thereby developing said firmware.

12. A developing system for a filing apparatus according to claim 9, wherein a block diagram of a servo control system for controlling said motor is input to said computer, and said computer converts said block diagram into firmware and them inputs said firmware to said developing device.

13. A measuring system for a filing apparatus for measuring mechanical operation of said filing apparatus which accommodates mechanical portions, said measuring system comprising:

said filing apparatus; and an external apparatus connected to said filing apparatus;

said filing apparatus including:

mechanical operation controlling means for controlling the mechanical portions of said filing apparatus;

measuring means for measuring various data which indicate the operation of said mechanical portion in time series, said measuring means operating independently of and in parallel with said mechanical operation controlling means;

storing means for storing said various measured data in the form of numeric values; and transferring means for transferring said various measured data to said external apparatus via an interface.

14. A measuring system for a filing apparatus according to claim 13, wherein said storing means stores a plurality of recently measured data.

15. A measuring system for a filing apparatus according to claim 13, wherein said measuring means measures when a predetermined designated trigger among a plurality of triggers for starting measurement emerges and stores the measured values.

16. A measuring system for a filing apparatus according to claim 13, wherein said measuring means measures a predetermined designated object among a plurality of objects of measurement.

17. A measuring system for a filing apparatus according to claim 15, wherein said measuring means measures before a trigger for starting measurement emerges and stores the latest measured values for a designated time.

18. A measuring system for a filing apparatus according to claim 17, wherein said storing means includes an area for cyclically storing said measured values for said designated time before said trigger for starting measurement emerges, and an area for storing measured values after said trigger for starting measurement emerges; and said transferring means arranges said measured values stored in said storing means, in the order of time series at the time of transferring said measured values to said external apparatus under demand from said external apparatus.

19. A measuring system for a filing apparatus according to claim 13, wherein said external apparatus includes:

means for storing the measured values received from said filing apparatus; and means for displaying said measured values.

20. A measuring system for a filing apparatus according to claim 19, wherein said external apparatus analyzes said measured values so as to determine the control constants of said mechanical operation controlling means within said filing apparatus, and sets said control constants on said mechanical operation controlling means.

21. A measuring system for a filing apparatus according to claim 20, wherein said external apparatus simulates the operation of said mechanical operation controlling means for operating said actuator and a motor, and displays the result of simulation and the result of measurement simultaneously.

22. A measuring system for a filing apparatus according to claim 20, wherein said external apparatus is connected to a plurality of filing apparatuses, and said external apparatus reads the measured values from said filing apparatuses which are caused to execute a predetermined operation, compares said measured values with preset standard values, and judges a filing apparatus whose measured values exceed the tolerance of said standard values as a defective.

23. A measuring system for a filing apparatus according to claim 13, wherein said filing apparatus and said external apparatus are connected with each other by a network, and the operation of said filing apparatus is measured at a remote place.

24. A measuring system for a filing apparatus according to claim 23, wherein said external apparatus analyzes said measured values received via said communicating means so as to determine the control constants of said mechanical operation controlling means within said filing apparatus, and sets said control constants on said mechanical operation controlling means via said communicating means.

25. A measuring system for a filing apparatus for measuring mechanical operation of said filing apparatus which accommodates mechanical portions, said measuring system comprising:

said filing apparatus; and an external apparatus connected to said filing apparatus;

said filing apparatus including:

mechanical operation controlling means for controlling the mechanical portions of said filing apparatus;

measuring means for measuring various data which indicate the operation of said mechanical portions in time series;

storing means for storing said various measured data in the form of numeric values; and transferring means for transferring said various measured data to said external apparatus via an interface, wherein, said measuring means measures the various data of a predetermined designated object among a plurality of objects of measurement when a predetermined designated trigger among a plurality of triggers for starting measurement emerges, and said storing means stores a plurality of recently measured data.

* * * * *

UNITED STATES PATENT AND TRADEMARK OFFICE
CERTIFICATE OF CORRECTION

PATENT NO. : 5,731,973  
DATED : March 24, 1998  
INVENTOR(S) : Takaishi et al.

It is certified that error appears in the above-identified patent and that said Letters Patent is hereby corrected as shown below:

Column 1, line 9, before "filing" insert --a--

Column 1, line 10, before "firmware" delete "a"

Column 1, line 22, after "speed" delete "a"

Column 1, line 28, after "speed" delete "a"

Column 1, line 65, after "especially" delete ","

Column 2, line 60, after "especially" delete ","

Column 6, line 62, delete "more"

UNITED STATES PATENT AND TRADEMARK OFFICE
CERTIFICATE OF CORRECTION

PATENT NO. : 5,731,973
DATED : March 24, 1998
INVENTOR(S) : Takaishi et al.

It is certified that error appears in the above-identified patent and that said Letters Patent is hereby corrected as shown below:

Column 7, line 14, after "of" insert --the--

Column 13, line 33, delete "command" and insert --commands-- therefor

Column 14, line 17, delete "DryFail" and insert --DrvFail-- therefor

Column 14, line 41, delete "DryGo" and insert --DrvGo-- therefor

Column 16, line 35, delete "DryGo" and insert --DrvGo-- therefor

Column 16, line 45, delete "DryGo" and insert --DrvGo-- therefor

UNITED STATES PATENT AND TRADEMARK OFFICE
CERTIFICATE OF CORRECTION

PATENT NO. : 5,731,973
DATED : March 24, 1998
INVENTOR(S) : Takaishi et al.

It is certified that error appears in the above-identified patent and that said Letters Patent is hereby corrected as shown below:

Column 17, line 29, delete "DryGo" and insert --DrvGo-- therefor

Column 17, line 34, delete "DryFail" and insert --DrvFail-- therefor

Column 20, line 14, before "firmware" delete "a"

Column 20, line 62, after "SIMULINK" delete ","

Column 20, line 62, after "name)" delete ")"

Column 23, line 23, before "there" insert --SPM and--

UNITED STATES PATENT AND TRADEMARK OFFICE
CERTIFICATE OF CORRECTION

PATENT NO. : 5,731,973
DATED : March 24, 1998
INVENTOR(S) : Takaishi et al.

It is certified that error appears in the above-identified patent and that said Letters Patent is hereby corrected as shown below:

Column 23, line 23, before "an interface"

delete "and"

Column 27, line 42, between "as" and "0"

insert a space

Column 30, line 30 before "change" insert

--the--

Column 34, line 30, delete "them" and insert

--then-- therefor

UNITED STATES PATENT AND TRADEMARK OFFICE
CERTIFICATE OF CORRECTION

PATENT NO. : 5,731,973
DATED : March 24, 1998
INVENTOR(S) : Takaishi et al

It is certified that error appears in the above-identified patent and that said Letters Patent is hereby corrected as shown below:

Column 34, line 42, delete "portion" and insert --portions-- therefor

Signed and Sealed this

Seventeenth Day of November, 1998

Attest:

BRUCE LEHMAN

Attesting Officer

Commissioner of Patents and Trademarks